US010824244B2

United States Patent
Kin et al.

(10) Patent No.: US 10,824,244 B2
(45) Date of Patent: Nov. 3, 2020

(54) SYSTEMS AND METHODS FOR TRANSITIONING BETWEEN MODES OF TRACKING REAL-WORLD OBJECTS FOR ARTIFICIAL REALITY INTERFACES

(71) Applicant: Facebook Technologies, LLC, Menlo Park, CA (US)

(72) Inventors: Kenrick Cheng-Kuo Kin, Redmond, WA (US); Maxime Ouellet, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/277,761

(22) Filed: Feb. 15, 2019

(65) Prior Publication Data
US 2020/0159337 A1    May 21, 2020

Related U.S. Application Data

(60) Provisional application No. 62/769,542, filed on Nov. 19, 2018.

(51) Int. Cl.
*G06F 3/03*        (2006.01)
*G06F 3/01*        (2006.01)
(Continued)

(52) U.S. Cl.
CPC .......... *G06F 3/0304* (2013.01); *A63F 13/211* (2014.09); *A63F 13/212* (2014.09);
(Continued)

(58) Field of Classification Search
None
See application file for complete search history.

(56) References Cited

U.S. PATENT DOCUMENTS 6,064,749 A *  5/2000  Hirota ............... G06F 3/011
                                                345/7
6,611,141 B1 *  8/2003  Schulz .............. G01C 21/165
                                                324/207.12
(Continued)

FOREIGN PATENT DOCUMENTS

WO    2017213969 A1    12/2017
WO    2018187171 A1    10/2018

OTHER PUBLICATIONS

Wang, Qiaozhi (George), "An Overview of Tracking Technologies for Virtual Reality", URL: https://www.linkedin.com/pulse/overview-tracking-technologies-virtual-reality-qiaozhi-george-wang/, LinkedIn, Feb. 28, 2017, pp. 1-9.

(Continued)

*Primary Examiner* — Jason A Pringle-Parker
(74) *Attorney, Agent, or Firm* — FisherBroyles, LLP

(57) ABSTRACT

The disclosed computer-implemented method may include tracking (1) a position of a primary real-world object within a real-world environment via a primary tracking method, and (2) a position of a secondary real-world object within the real-world environment via a secondary tracking method. The method may further include presenting (1) a primary virtual object at a position within an artificial environment corresponding to the tracked position of the primary real-world object, and (2) a secondary virtual object at a position within the artificial environment corresponding to the tracked position of the secondary real-world object. The method may further include (1) detecting an interaction of the primary real-world object with the secondary real-world object, and (2) transitioning to tracking the position of the primary real-world object via the secondary tracking method. Various other methods, systems, and computer-readable media are also disclosed.

17 Claims, 13 Drawing Sheets

(51) Int. Cl.
*A63F 13/211* (2014.01)
*A63F 13/212* (2014.01)

(52) U.S. Cl.
CPC .............. *G06F 3/011* (2013.01); *G06F 3/017* (2013.01); *A63F 2300/8082* (2013.01)

(56) References Cited

U.S. PATENT DOCUMENTS

| | | | | |
|---|---|---|---|---|
| 9,939,888 | B2* | 4/2018 | Wilson | G06F 1/1694 |
| 2009/0209343 | A1* | 8/2009 | Foxlin | G07F 17/32 |
| | | | | 463/36 |
| 2011/0287839 | A1* | 11/2011 | Asami | A63F 13/10 |
| | | | | 463/36 |
| 2012/0302347 | A1* | 11/2012 | Nicholson | A63F 13/24 |
| | | | | 463/37 |
| 2015/0177843 | A1* | 6/2015 | Kwon | G06F 3/017 |
| | | | | 715/863 |
| 2016/0171770 | A1* | 6/2016 | Pedrotti | G02B 27/017 |
| | | | | 345/633 |
| 2017/0189798 | A1 | 7/2017 | Rogoza et al. | |
| 2017/0274277 | A1* | 9/2017 | Vandonkelaar | A63F 13/211 |
| 2017/0329515 | A1 | 11/2017 | Clement et al. | |
| 2017/0358139 | A1 | 12/2017 | Balan et al. | |
| 2018/0114364 | A1* | 4/2018 | McPhee | A63F 13/211 |
| 2018/0157398 | A1* | 6/2018 | Kaehler | G06F 3/011 |
| 2018/0190034 | A1 | 7/2018 | Shapira et al. | |
| 2018/0284969 | A1 | 10/2018 | Welker et al. | |
| 2019/0262697 | A1* | 8/2019 | Kim | A63F 13/218 |

OTHER PUBLICATIONS

Lang, Ben, "Oculus Claims Breakthrough in Hand-tracking Accuracy", URL: https://www.roadtovr.com/oculus-claims-breakthrough-in-hand-tracking-accuracy/, May 3, 2018, pp. 1-3.

ISA/EPO, International Search Report and Written Opinion of the International Searching Authority, Int'l App. No. PCT US2019/061357, dated Feb. 18, 2020, European Patent Office, Rijswijk, NL, 12 pgs.

* cited by examiner

SYSTEMS AND METHODS FOR TRANSITIONING BETWEEN MODES OF TRACKING REAL-WORLD OBJECTS FOR ARTIFICIAL REALITY INTERFACES

CROSS REFERENCE TO RELATED APPLICATION

This application claims the benefit of U.S. Provisional Application No. 62/769,542, filed Nov. 19, 2018, the disclosure of which is incorporated, in its entirety, by this reference.

BACKGROUND

Artificial reality systems, such as virtual reality (VR) systems and/or augmented reality (AR) systems, may provide thrilling experiences that may be more immersive than almost any other digital entertainment or simulation experience available today. Artificial reality systems may enable users to travel through space and time, interact with friends in three-dimensional worlds, or play video games in radically redefined ways. Artificial reality systems may also be used for purposes other than recreation. Governments may use them for military training simulations, doctors may use them to practice surgery, and engineers may use them as visualization aids. Artificial reality systems may also be used for productivity purposes. Information organization, collaboration, and privacy may all be enabled or enhanced through the use of artificial reality systems.

Unfortunately, it may be difficult for users to interact with real-world objects (e.g., controllers, keyboards, writing tools, furniture, etc.) while interacting with some artificial reality systems. For example, some artificial reality systems may include head-worn display systems and/or near-eye displays (NEDs) that, when worn by a user, may obstruct a line of sight between the user's eyes and one or more real-world objects. This lack of visual feedback may cause inefficiencies in user interaction with real-world objects while users are wearing such devices. This may be particularly problematic when such real-world objects may include the user's hands and/or one or more input devices associated with the artificial reality system (e.g., an artificial reality input device, a game controller, etc.). For example, it may be difficult for a user to locate and/or pick up a game controller associated with the artificial reality system while wearing a head-worn display system.

Furthermore, modern artificial reality systems may include and/or may be associated with various systems for tracking physical objects within a real-world environment. Some of these tracking systems may employ tracking methods that may have comparative differences (e.g., accuracy, resolution, power efficiency, etc.) that may make one tracking method more suitable for a particular situation than another tracking method. Unfortunately, conventional artificial reality systems may be unable to effectively and/or efficiently transition between tracking methods when it may be advantageous to do so.

Hence, the instant disclosure identifies and addresses a need for new systems and methods for transitioning between modes of tracking real-world objects for artificial reality interfaces.

SUMMARY

As will be described in greater detail below, the instant disclosure describes various systems and methods for transitioning between modes of tracking real-world objects for artificial reality interfaces. Embodiments of the systems and methods described herein may track positions of a primary and a secondary real-world object within a real-world environment via a respective primary and secondary tracking method (e.g., a computer vision tracking method, an optical tracking method, an inertial tracking method, etc.). Embodiments may also present a primary and a secondary virtual object within an artificial environment at respective positions corresponding to the positions of the primary and secondary objects within the real-world environment. Embodiments may also detect an interaction of the primary real-world object with the secondary real-world object, and may transition from tracking the position of the primary real-world object within the real-world environment via the primary tracking method to tracking the position of the primary real-world object within the real-world environment via the secondary tracking method in response to detecting the interaction of the primary real-world object with the secondary real-world object.

In one example, a computer-implemented method for transitioning between modes of tracking real-world objects for artificial reality interfaces may include tracking (1) a position of a primary real-world object within a real-world environment via a primary tracking method, and (2) a position of a secondary real-world object within the real-world environment via a secondary tracking method. The computer-implemented method may further include presenting (1) a primary virtual object that represents the primary real-world object at a position within an artificial environment corresponding to the position of the primary real-world object within the real-world environment, and (2) a secondary virtual object that represents the secondary real-world object at a position within the artificial environment corresponding to the position of the secondary real-world object within the real-world environment. The computer-implemented method may further include detecting an interaction of the primary real-world object with the secondary real-world object, and transitioning from tracking the position of the primary real-world object within the real-world environment via the primary tracking method to tracking the position of the primary real-world object within the real-world environment via the secondary tracking method in response to detecting the interaction of the primary real-world object with the secondary real-world object.

In at least one embodiment, the method may further include (1) detecting an additional interaction of the primary real-world object with the secondary real-world object, and (2) transitioning from tracking the position of the primary real-world object within the real-world environment via the secondary tracking method to tracking the position of the primary real-world object within the real-world environment via the primary tracking method in response to detecting the additional interaction of the primary real-world object with the secondary real-world object.

In one or more embodiments, the primary tracking method may include a computer vision tracking method and the secondary tracking method may include at least one of: (1) an optical tracking method, (2) a simultaneous localization and mapping (SLAM) tracking method, or (3) an inertial tracking method. In at least one embodiment, the method may further include adjusting, in response to transitioning from tracking the position of the primary real-world object within the real-world environment via the primary tracking method to tracking the position of the primary real-world object within the real-world environment via the secondary tracking method, an appearance of at least one of (1) the primary virtual object, or (2) the secondary virtual object.

In some examples, the computer-implemented method may further include determining a proximity of the primary real-world object to the secondary real-world object. In at least one example, detecting the interaction of the primary real-world object with the secondary real-world object may include determining that the proximity of the primary real-world object to the secondary real-world object is less than a predetermined threshold. In one or more examples, the computer-implemented method may further include adjusting, based on the proximity of the primary real-world object to the secondary real-world object, an appearance of at least one of (1) the primary virtual object, or (2) the secondary virtual object.

In some embodiments, the computer-implemented method may further include presenting, in response to transitioning from tracking the position of the primary real-world object within the real-world environment via the primary tracking method to tracking the position of the primary real-world object within the real-world environment via the secondary tracking method, at the position within the artificial environment corresponding to the position of the primary real-world object within the real-world environment, a unified virtual object that represents both the primary virtual object and the secondary virtual object.

In at least one embodiment, the primary real-world object may include a hand of a user, and the secondary real-world object may include an artificial reality controller device. In one or more embodiments, the secondary real-world object may include a touch sensor, and detecting the interaction of the primary real-world object with the secondary real-world object may include detecting, via the touch sensor, a touch of the secondary real-world object by the primary real-world object.

In some examples, the computer-implemented method may further include determining that the primary real-world object may include one of (1) a left hand of a user, or (2) a right hand of the user. In at least one example, the secondary real-world object may include an artificial reality controller device configured to be operated by the user via one of (1) the left hand of the user, or (2) the right hand of the user. In one or more examples, the computer-implemented method may further include presenting a notification to the user upon detecting the interaction of the primary real-world object with the secondary real-world object and when at least one of (1) the artificial reality controller device is configured to be operated by the right hand of the user and upon determining that the primary real-world object comprises the left hand of the user, or (2) the artificial reality controller device is configured to be operated by the left hand of the user and upon determining that the primary real-world object comprises the right hand of the user.

In addition, a corresponding system for transitioning between modes of tracking real-world objects for artificial reality interfaces may include several modules stored in memory, including a tracking module that tracks (1) a position of a primary real-world object within a real-world environment via a primary tracking method, and (2) a position of a secondary real-world object within the real-world environment via a secondary tracking method. The system may also include a presenting module that presents (1) a primary virtual object that represents the primary real-world object at a position within an artificial environment corresponding to the position of the primary real-world object within the real-world environment, and (2) a secondary virtual object that represents the secondary real-world object at a position within the artificial environment corresponding to the position of the secondary real-world object within the real-world environment.

The system may further include a detecting module that detects an interaction of the primary real-world object with the secondary real-world object. The system may also include a transitioning module that transitions from tracking the position of the primary real-world object within the real-world environment via the primary tracking method to tracking the position of the primary real-world object within the real-world environment via the secondary tracking method in response to detecting the interaction of the primary real-world object with the secondary real-world object. The system may also include at least one physical processor that executes the tracking module, the presenting module, the detecting module, and the transitioning module.

In at least one embodiment, the detecting module may further detect an additional interaction of the primary real-world object with the secondary real-world object, and the transitioning module may further transition from tracking the position of the primary real-world object within the real-world environment via the secondary tracking method to tracking the position of the primary real-world object within the real-world environment via the primary tracking method in response to detecting the additional interaction of the primary real-world object with the secondary real-world object.

In one or more embodiments, the presenting module may further adjust, in response to the transitioning module transitioning from tracking the position of the primary real-world object within the real-world environment via the primary tracking method to tracking the position of the primary real-world object within the real-world environment via the secondary tracking method, an appearance of at least one of (1) the primary virtual object, or (2) the secondary virtual object.

In some examples, the detecting module may further determine a proximity of the primary real-world object to the secondary real-world object. In at least one example, the detecting module may detect the interaction of the primary real-world object with the secondary real-world object by determining that the proximity of the primary real-world object to the secondary real-world object is less than a predetermined threshold. In one or more examples, the presenting module may adjust, based on the proximity of the primary real-world object to the secondary real-world object, an appearance of at least one of (1) the primary virtual object, or (2) the secondary virtual object.

In some embodiments, the secondary real-world object may include an artificial reality controller device configured to be operated by a user via one of (1) a left hand of the user, or (2) a right hand of the user. In at least one embodiment, the detecting module further determines that the primary real-world object may include one of (1) the left hand of the user or (2) the right hand of the user. In one or more embodiments, the presenting module may further present a notification to the user upon the detecting module detecting the interaction of the primary real-world object with the secondary real-world object and when at least one of (1) the artificial reality controller device is configured to be operated by the right hand of the user and upon the detecting module determining that the primary real-world object comprises the left hand of the user, or (2) the artificial reality controller device is configured to be operated by the left hand of the user and upon the detecting module determining that the primary real-world object comprises the right hand of the user.

In some examples, the above-described method may be encoded as computer-readable instructions on a computer-readable medium. For example, a computer-readable medium may include one or more computer-executable instructions that, when executed by at least one processor of a computing device, may cause the computing device to track (1) a position of a primary real-world object within a real-world environment via a primary tracking method, an (2) a position of a secondary real-world object within the real-world environment via a secondary tracking method. The computer-readable medium may further include one or more computer-executable instructions that, when executed by the processor of the computing device, may cause the computing device to present (1)+a primary virtual object that represents the primary real-world object at a position within an artificial environment corresponding to the position of the primary real-world object within the real-world environment, and (2) a secondary virtual object that represents the secondary real-world object at a position within the artificial environment corresponding to the position of the secondary real-world object within the real-world environment.

The computer-readable medium may further include one or more computer-executable instructions that, when executed by the processor of the computing device, may cause the computing device to detect an interaction of the primary real-world object with the secondary real-world object. The computer-readable medium may further include one or more computer-executable instructions that, when executed by the processor of the computing device, may cause the computing device to transition from tracking the position of the primary real-world object within the real-world environment via the primary tracking method to tracking the position of the primary real-world object within the real-world environment via the secondary tracking method in response to detecting the interaction of the primary real-world object with the secondary real-world object.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
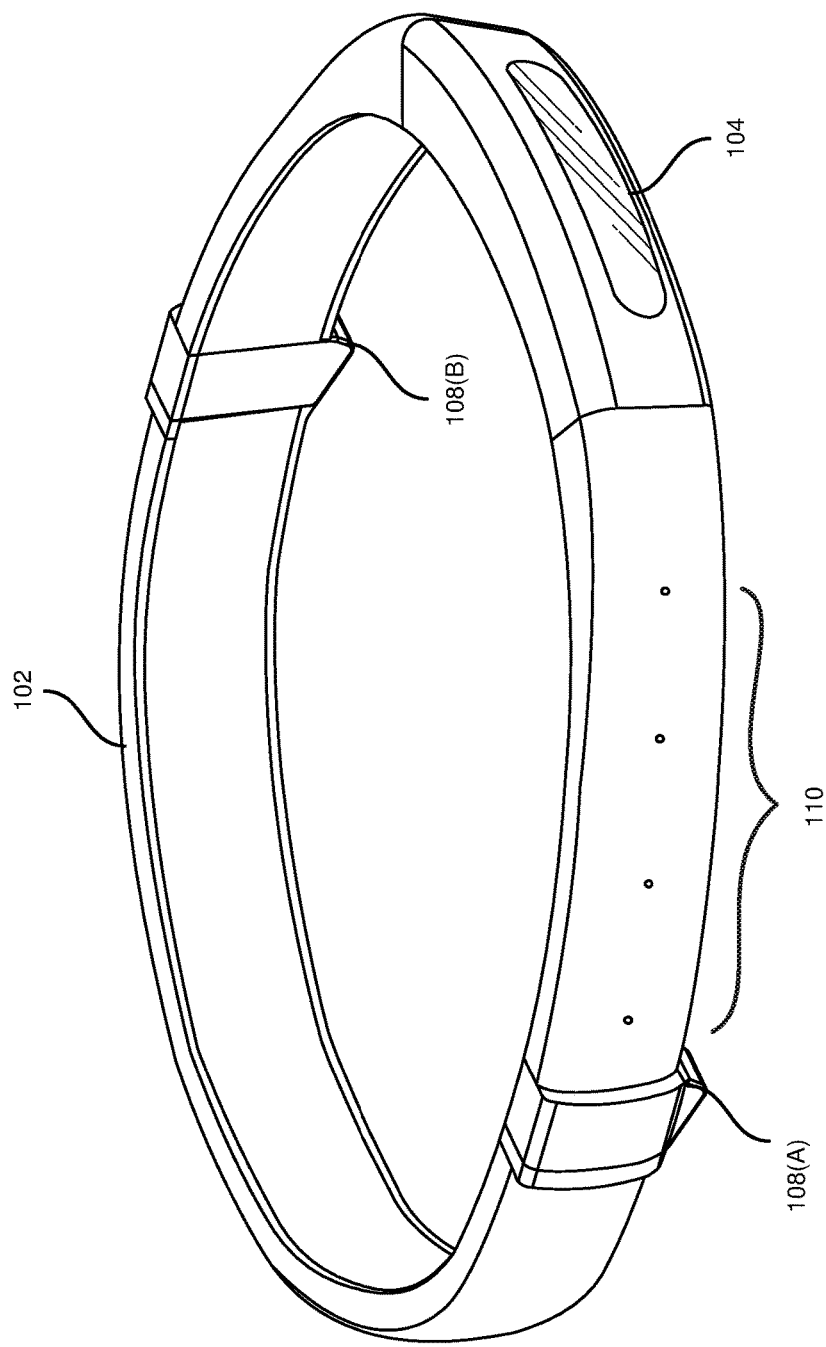
FIG. 1-3 illustrate various artificial reality systems that may implement, include and/or be included in one or more systems for transitioning between modes of tracking real-world objects for artificial reality interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for transitioning between modes of tracking real-world objects for artificial reality interfaces. As will be explained in greater detail below, embodiments of the instant disclosure may track a position of a primary real-world object (e.g., a user's hand, an input device, a game controller, etc.) within a real-world environment via a primary tracking method (e.g., a computer vision tracking method, an optical tracking method, an inertial tracking method, etc.). Embodiments of this disclosure may also track a position of a secondary real-world object (e.g., another hand of the user, a hand of another user, another input device, another game controller, etc.) within the real-world environment via a secondary tracking method (e.g., another computer vision tracking method, another optical tracking method, another inertial tracking method, etc.).

Additionally, embodiments of the instant disclosure may present a primary virtual object (e.g., a computer-generated model, a graphical object, etc.) that represents the primary real-world object at a position within an artificial environment corresponding to the position of the primary real-world object within the real-world environment. Likewise, an embodiment may also present a secondary virtual object (e.g., another computer-generated model, another graphical object, etc.) that represents the secondary real-world object at a position within the artificial environment corresponding to the position of the secondary real-world object within the real-world environment.

An embodiment may also detect an interaction (e.g., a touch, a contact, an approach within a predetermined distance, etc.) of the primary real-world object with the secondary real-world object, such as a user picking up an artificial reality controller device with one of his or her hands. In response to detecting the interaction, an embodiment may transition from tracking the position of the primary real-world object within the real-world environment via the primary tracking method to tracking the position of the primary real-world object within the real-world environment via the secondary tracking method.

As will be explained in further detail below, the systems and methods described herein may improve an ability of the user to interact with real-world objects while using an artificial reality system (e.g., a VR system, an AR system, a combination thereof, and so forth). For example, as a user interacts with an artificial reality system that includes, is in communication with, and/or is associated with an embodiment of the systems and methods described herein, the user may be able to visualize interactions between real-world objects as they occur, such as the user reaching his or her hand toward an artificial reality controller device and/or the user picking up the artificial reality controller device. Furthermore, by facilitating smooth transitions between methods for tracking real-world objects, the systems and methods described herein may enable artificial reality systems to more efficiently and/or effectively utilize various available tracking methods to track real-world objects, thereby improving various aspects of artificial reality systems such as power usage characteristics, situational and/or absolute tracking accuracy, interactivity with real and/or virtual objects and/or environments, and so forth.

Figure 2:
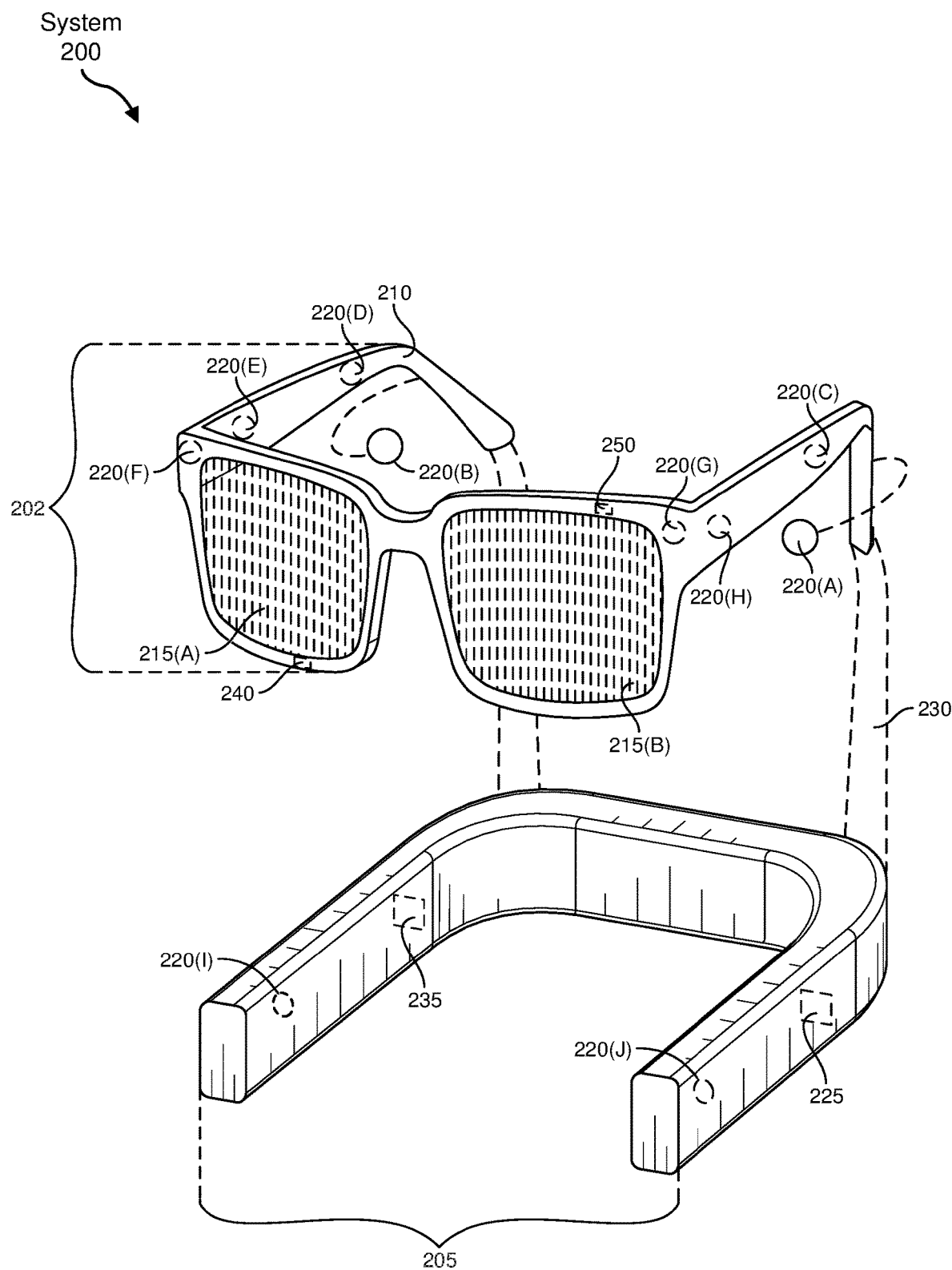
Figure 3:
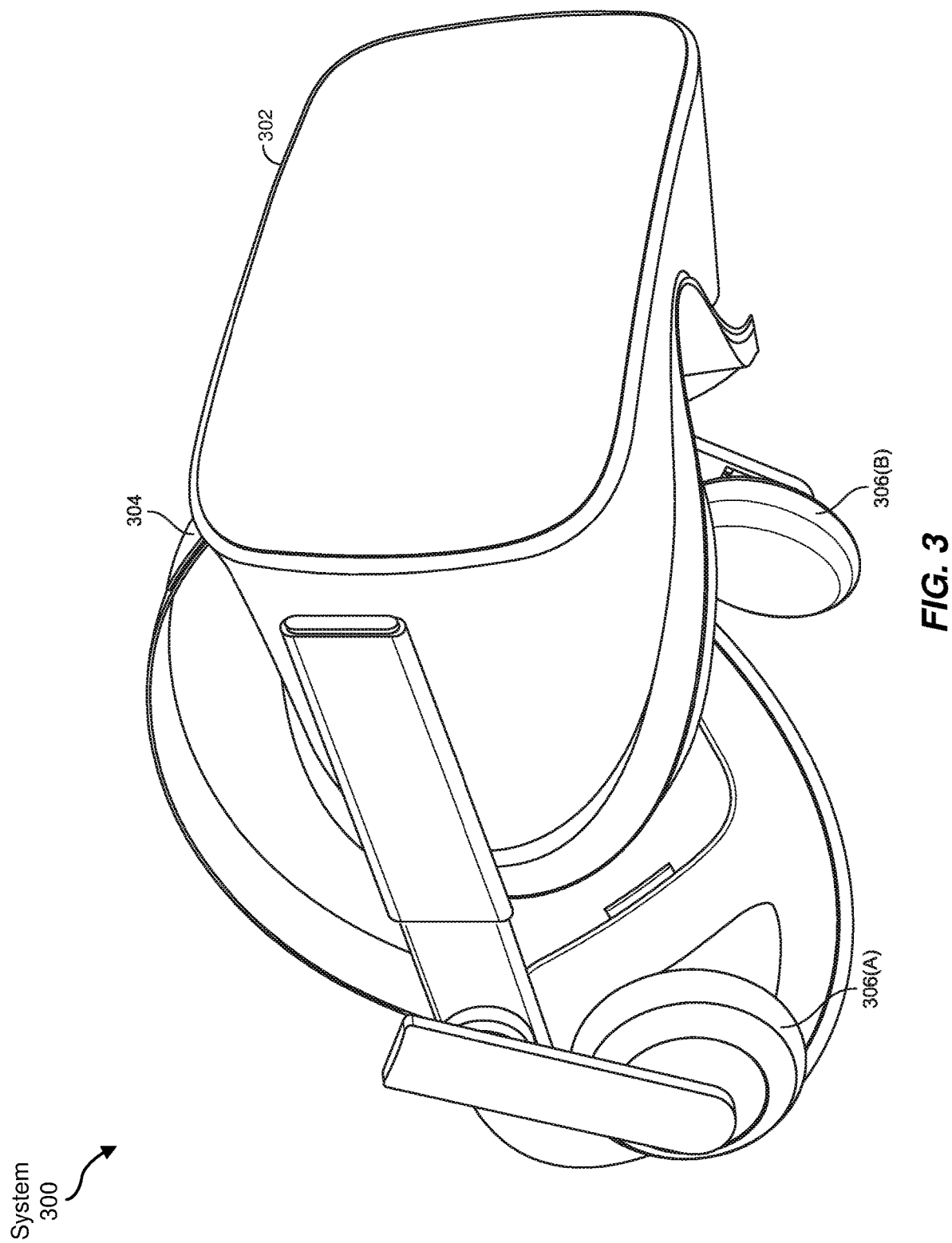

The following will provide, with reference to FIGS. 1-3, detailed descriptions of various artificial reality systems. Additionally, the following will provide, with reference to FIGS. 4-5 and FIGS. 6-13, detailed descriptions of systems for transitioning between modes of tracking real-world objects for artificial reality interfaces. Detailed descriptions of corresponding computer-implemented methods will also be provided in connection with FIG. 6.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include hand-held controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, AR system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(1) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by the controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing the AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to the AR system 200. In the embodiment of FIG. 2, neckband 205 may include two acoustic sensors (e.g., 220(1) and 220(J)) that are part of the microphone array (or potentially form their own microphone subarray). Neckband 205 may also include a controller 225 and a power source 235.

Acoustic sensors 220(1) and 220(J) of neckband 205 may be configured to detect sound and convert the detected sound into an electronic format (analog or digital). In the embodiment of FIG. 2, acoustic sensors 220(1) and 220(J) may be positioned on neckband 205, thereby increasing the distance between the neckband acoustic sensors 220(1) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DoA) estimation to estimate a direction from which the detected sound arrived at the microphone array. As the microphone array detects sounds, controller 225 may populate an audio data set with the information. In embodiments in which AR system 200 includes an inertial measurement unit, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to the user.

Power source 235 in neckband 205 may provide power to eyewear device 202 and/or to neckband 205. Power source 235 may include, without limitation, lithium ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, to track one or more real-world objects, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, hand-held controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including Wi-Fi, Bluetooth, global positioning system (GPS), cellular or other communication devices may be also used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as AR system 100, AR system 200, and VR system 300 of FIGS. 1, 2 and 3, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

Figure 4:
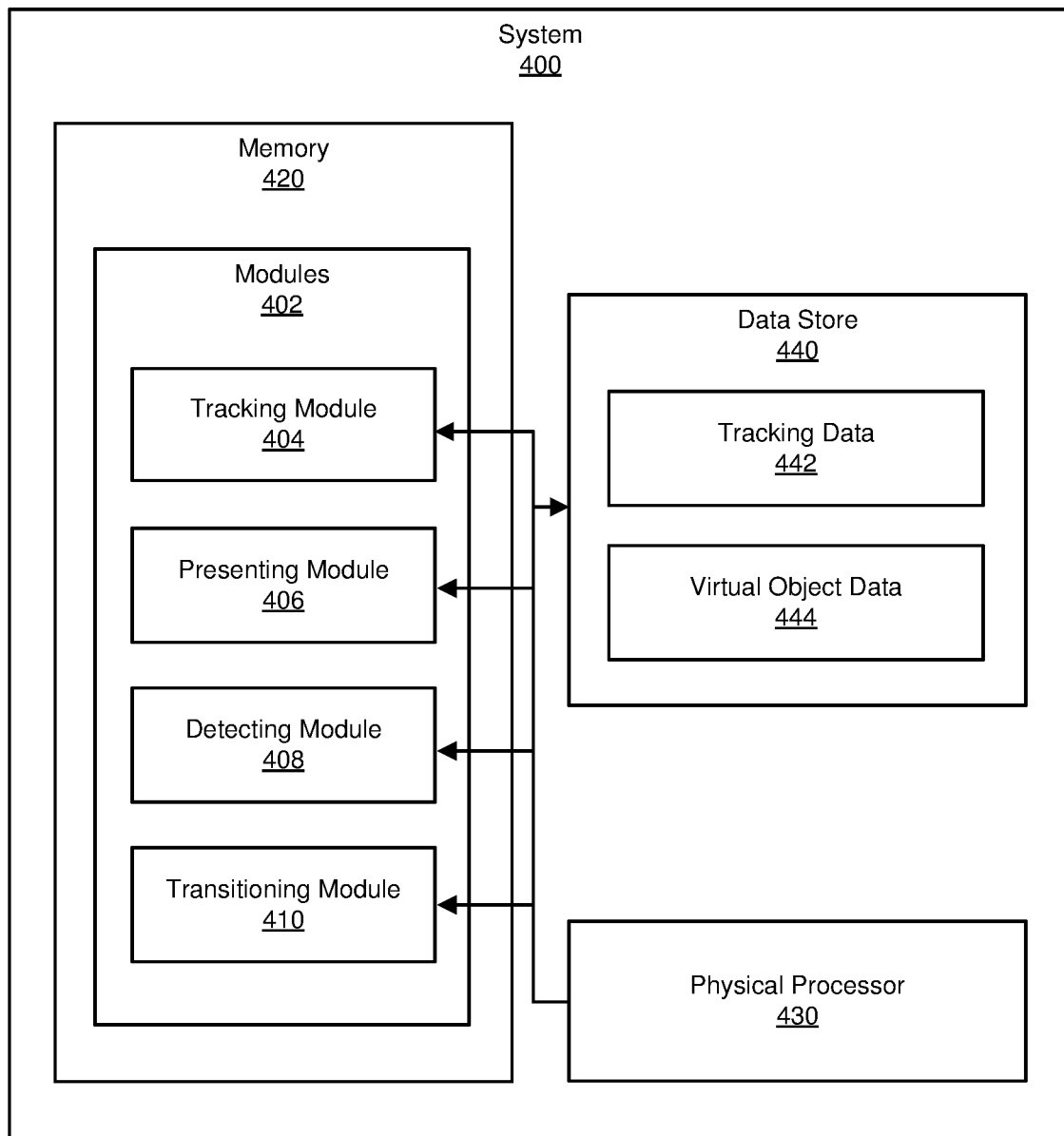
FIG. 4 is a block diagram of an example system for transitioning between modes of tracking real-world objects for artificial reality interfaces.

FIG. 4 is a block diagram of an example system 400 for transitioning between modes of tracking real-world objects for artificial reality interfaces. As illustrated in this figure, example system 400 may include one or more modules 402 for performing one or more tasks. As will be explained in greater detail below, modules 402 may include a tracking module 404 that may track (1) a position of a primary real-world object within a real-world environment via a primary tracking method, and (2) a position of a secondary real-world object within the real-world environment via a secondary tracking method. Modules 402 may also include a presenting module 406 that presents a primary virtual object that represents the primary real-world object at a position within an artificial environment corresponding to the position of the primary real-world object within the real-world environment. In some examples, presenting module 406 may also present a secondary virtual object that represents the secondary real-world object at a position within the artificial environment corresponding to the position of the secondary real-world object within the real-world environment.

As further shown in FIG. 400, modules 402 may also include a detecting module 408 that detects an interaction of the primary real-world object with the secondary real-world object. Modules 402 may further include a transitioning module 410 that transitions from tracking the position of the primary real-world object within the real-world environment via the primary tracking method to tracking the position of the primary real-world object within the real-world environment via the secondary tracking method in response to detecting the interaction of the primary real-world object with the secondary real-world object.

As further illustrated in FIG. 4, example system 400 may also include one or more memory devices, such as memory 420. Memory 420 generally represents any type or form of volatile or non-volatile storage device or medium capable of storing data and/or computer-readable instructions. In one example, memory 420 may store, load, and/or maintain one or more of modules 402. Examples of memory 420 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 420. Additionally or alternatively, physical processor 430 may execute one or more of modules 402 to facilitate transitioning between modes of tracking real-world objects for artificial reality interfaces. Examples of physical processor 430 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 4, example system 400 may also include one or more data stores, such as data store 440, that may receive, store, and/or maintain data. Data Store 440 may represent portions of a single data store or computing device or a plurality of data stores or computing devices. In some embodiments, data store 440 may be a logical container for data and may be implemented in various forms (e.g., a database, a file, a file system, a data structure, etc.). Examples of data store 440 may include, without limitation, files, file systems, data stores, databases, and/or database management systems such as an operational data store (ODS), a relational database, a NoSQL database, a NewSQL database, and/or any other suitable organized collection of data.

In at least one example, data store 440 may include tracking data 442 and/or virtual object data 444. As will be explained in greater detail below, in some examples, tracking data 442 may include any information that a tracking method may use to identify, calculate, detect, and/or otherwise determine a position of at least one real-world object. Additionally, virtual object data 444 may include any suitable data associated with virtual objects that may be presented within an artificial environment including, without limitation, 2D models, 3D models, animation and/or movement data associated with a virtual object, data associated with relationships between and/or among virtual objects, and so forth.

Figure 5:
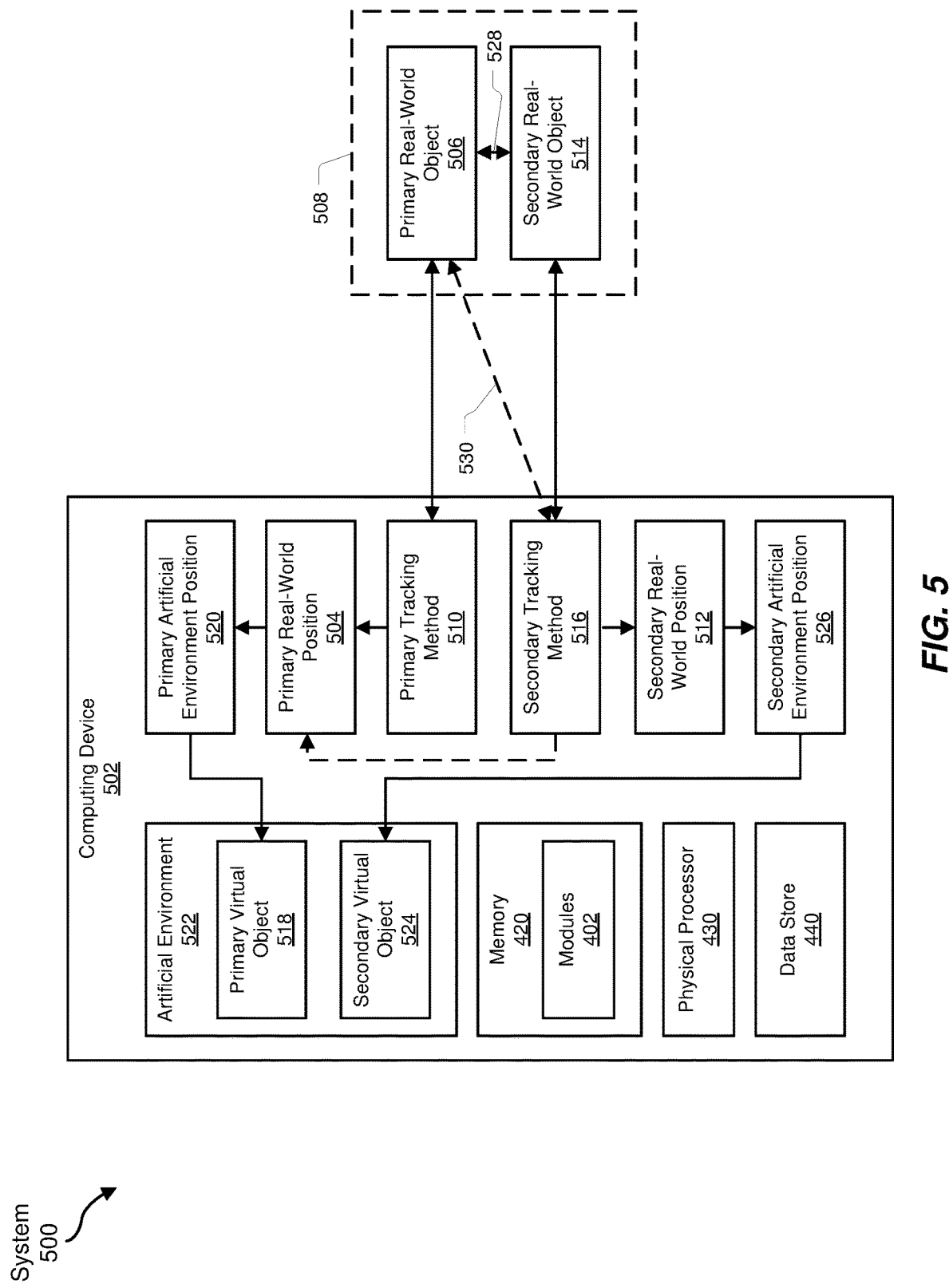
FIG. 5 is a block diagram of an example implementation of an example system for transitioning between modes of tracking real-world objects for artificial reality interfaces.

Example system 400 in FIG. 4 may be implemented in a variety of ways. For example, all or a portion of example system 400 may represent portions of an example system 500 ("system 500") in FIG. 5. As shown in FIG. 5, system 500 may include a computing device 502. In at least one example, computing device 502 may be programmed with one or more of modules 402. Additionally, in some embodiments, system 500 may be associated with and/or included as part of a suitable artificial reality system (e.g., one or more of AR system 100, AR system 200, and/or VR system 300).

In at least one embodiment, one or more modules 402 from FIG. 4 may, when executed by computing device 502, enable computing device 502 to perform one or more operations to transition between modes of tracking real-world objects for artificial reality interfaces. For example, as will be described in greater detail below, tracking module 404 may cause computing device 502 to track a position (e.g., primary real-world position 504) of a primary real-world object (e.g., primary real-world object 506) within a real-world environment (e.g., real-world environment 508) via a primary tracking method (e.g., primary tracking method 510). In some examples, tracking module 404 may further cause computing device 502 to track a position (e.g., secondary real-world position 512) of a secondary real-world object (e.g., secondary real-world object 514) within the real-world environment via a secondary tracking method (e.g., secondary tracking method 516).

Additionally, presenting module 406 may, when executed by computing device 502, cause computing device 502 to present a primary virtual object (e.g., primary virtual object 518) that represents the primary real-world object at a position (e.g., primary artificial environment position 520) within an artificial environment (e.g., artificial environment 522) corresponding to the position of the primary real-world object within the real-world environment. Presenting module 406 may also, when executed by computing device 502, cause computing device 502 to present a secondary virtual object (e.g., secondary virtual object 524) that represents the secondary real-world object at a position within the artificial environment (e.g., secondary artificial environment position 526) corresponding to the position of the secondary real-world object within the real-world environment.

Furthermore, detecting module 408 may, when executed by computing device 502, cause computing device 502 to detect an interaction of the primary real-world object with the secondary real-world object (e.g., interaction 528). Moreover, transitioning module 410 may, when executed by computing device 502, cause computing device 502 to transition (e.g., indicated in FIG. 5 by transition 530) from tracking the position of the primary real-world object within the real-world environment via the primary tracking method to tracking the position of the primary real-world object within the real-world environment via the secondary tracking method in response to detecting the interaction of the primary real-world object with the secondary real-world object.

Computing device 502 generally represents any type or form of computing device capable of reading and/or executing computer-executable instructions. Examples of computing device 502 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, custom computing devices, combinations of one or more of the same, or any other suitable mobile computing device.

In at least one example, computing device 502 may be a computing device programmed with one or more of modules 402. All or a portion of the functionality of modules 402 may be performed by computing device 502 and/or any other suitable computing system. As will be described in greater detail below, one or more of modules 402 from FIG. 4 may, when executed by at least one processor of computing device 502 may enable computing device 502 to transitioning between modes of tracking real-world objects for artificial reality interfaces.

Many other devices or subsystems may be connected to example system 400 in FIG. 4 and/or example system 500 in FIG. 5. Conversely, all of the components and devices illustrated in FIGS. 4 and 5 need not be present to practice the embodiments described and/or illustrated herein. The devices and subsystems referenced above may also be interconnected in different ways from those shown in FIG. 5. Example system 400 and example system 500 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 6:
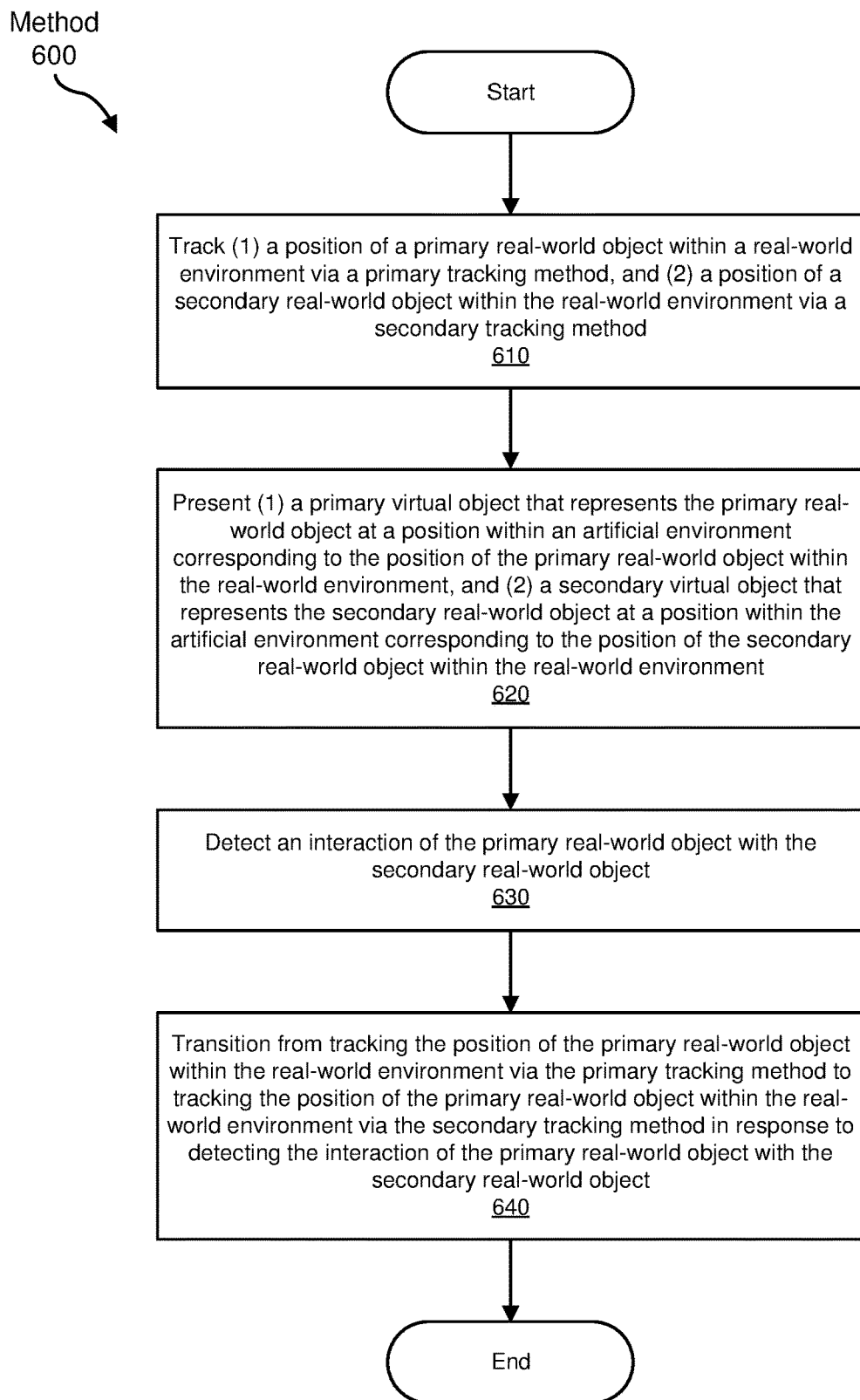
FIG. 6 is a flow diagram of an example method for transitioning between modes of tracking real-world objects for artificial reality interfaces.

FIG. 6 is a flow diagram of an example computer-implemented method 600 for allocating shared resources in multi-tenant environments. The steps shown in FIG. 6 may be performed by any suitable computer-executable code and/or computing system, including example system 400 in FIG. 4, example system 500 in FIG. 5, and/or variations or combinations of one or more of the same. In one example, each of the steps shown in FIG. 6 may represent an algorithm whose structure includes and/or is represented by multiple sub-steps, examples of which will be provided in greater detail below.

As illustrated in FIG. 6, at step 610, one or more of the systems described herein may track (1) a position of a primary real-world object within a real-world environment via a primary tracking method, and (2) a position of a secondary real-world object within the real-world environment via a secondary tracking method. For example, tracking module 404 may, as part of computing device 502, cause computing device 502 to track primary real-world position 504 of primary real-world object 506 within real-world environment 508 via primary tracking method 510. Additionally, tracking module 404 may, as part of computing device 502, cause computing device 502 to track secondary real-world position 512 of secondary real-world object 514 within real-world environment 508 via secondary tracking method 516.

In some examples, a "tracking method" may include any suitable method for tracking, positioning, locating, and/or orienting a real-world object within a real-world environment. By way of example, and without limitation, a tracking method may include an optical tracking method such as a marker-based tracking method, a computer vision tracking method, a SLAM tracking method, an inertial tracking method (e.g., a tracking method that employs one or more IMUs to track a real-world object), combinations or variations of one or more of the same, and so forth.

For example, primary tracking method 510 may include a computer vision tracking method whereby tracking module 404, as part of computing device 502, may process data from one or more optical sensors such as 2D or 3D cameras, time-of-flight depth sensors, single-beam or sweeping laser rangefinders, 3D LiDAR sensors, and/or any other suitable type or form of optical sensors such as may be included in an artificial reality system (e.g., VR system 300) to determine and/or track primary real-world position 504 of primary real-world object 506.

In some examples, tracking module 404, as part of computing device 502, may process data from the optical sensors in accordance with one or more machine learning techniques in order to track (e.g., identify, position, locate, and/or orient) primary real-world object 506 within real-world environment 508. For example, in some embodiments, primary real-world object 506 may include a hand of a user, and tracking module 404 may gather data from an optical tracking system and/or a marker-based tracking system to record high-fidelity hand interactions. Tracking module 404 may condense the recorded data into 2D imagery and may then use the 2D imagery to train one or more convolutional neural networks (CNNs) to identify positions and/or motions of the markers across a large set of hand pose imagery. This may effectively allow a computing system (e.g., computing device 502) to determine a likely position of a hand when later provided with a set of images of a hand of a user. Additionally or alternatively, a suitable CNN may be pre-trained and stored within a suitable data storage location (e.g., as part of tracking data 442 stored within data store 440). Thus, one or more of modules 402 (e.g., tracking module 404) may use a suitable sensor (e.g., an optical sensor included in any of AR system 100, AR system 200, or VR system 300) to capture imagery of the user's hands as the user uses an artificial reality system (e.g., any of systems 100, 200, and/or 300), and may use the captured imagery of one or more of the user's hands and the trained CNN to determine and/or track a position of the user's hand or hands within a real-world environment (e.g., real-world environment 508).

Figure 7:
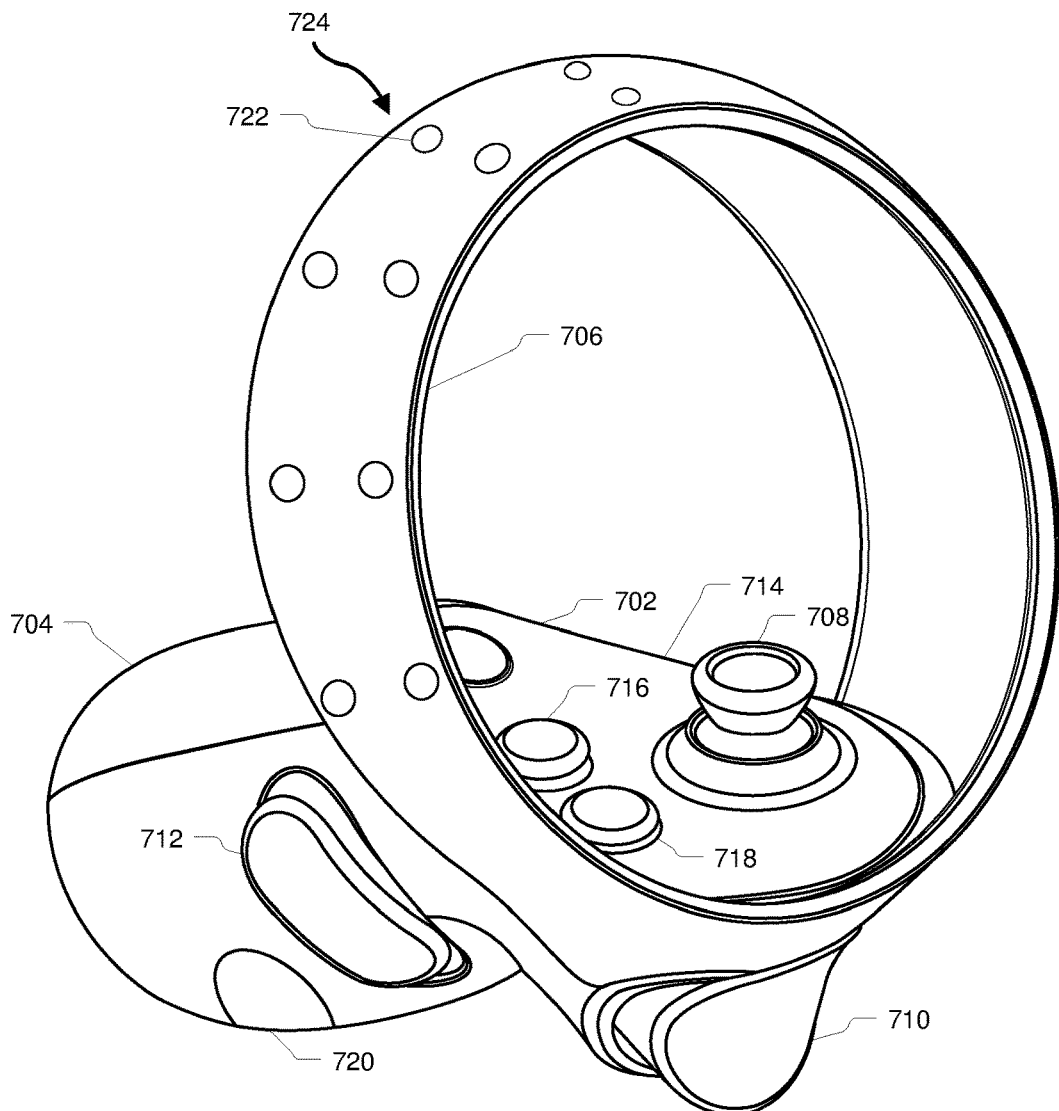
FIG. 7 is a perspective view of an example hand-held controller for an artificial reality system.

As another example, secondary tracking method 516 may include an optical tracking method, a SLAM tracking method, and/or an inertial tracking method, and secondary real-world object 514 may include a hand-held controller that may be configured to be tracked via an optical tracking method, a SLAM tracking method, and/or an inertial tracking method. For example, FIG. 7 illustrates an artificial reality controller device 700 ("hand-held controller 700"). Hand-Held controller 700 may be one of a pair or set of hand-held controllers associated with an artificial reality system (e.g., one or more of AR system 100, AR system 200, and/or VR system 300). Hand-Held controller 700 includes a main body 702 and a handle portion 704 extending from main body 702. In some embodiments, a surrounding ring portion 706 extends from main body 702. As shown in FIG. 700, in some examples, hand-held controller 700 may be configured to be operated by a user via a left hand of the user. In additional or alternative examples, an artificial reality controller device may be configured to be operated by a user via a right hand of the user. In further examples, a hand-held controller may be configured to be operated by any hand of a user.

As shown in FIG. 7, hand-held controller 700 includes an analog stick 708, a trigger button 710, and a third-finger button 712. Main body 702 includes a thumb surface 714 from which analog stick 708 extends. Main body 702 may also include one or more buttons (e.g., button 716 and button 718) positioned on thumb surface 714. In some embodiments, thumb surface 714 may be a substantially planar surface. Handle portion 704 extends from main body 702 on a side generally opposite trigger button 710. Third-finger button 712 is operative to detect whether the user is grasping handle portion 704 with his or her third-finger. In some embodiments, third-finger button 712 may detect various degrees of deflection corresponding to the force or pressure of a user's grip on handle portion 704.

In some embodiments, third-finger button 712 may be active depending on the context of an associated virtual environment or game. In other embodiments, third-finger button 712 may be activated mechanically or by another sensor. In at least one embodiment, handle portion 704 may also include a palm sensor (e.g., analogous to a pistol grip safety or grip switch), such that when the palm sensor detects the user's hand, and the third-finger button 712 is released, an output signal indicates an "open-hand gesture."

In some embodiments, handle portion 704 may include one or more detection sensors 720 positioned to detect the presence of the user's palm or a portion of a finger, indicating that the user is holding handle portion 704, indicating how the user is holding handle portion 704, and/or how the user is moving his or her hand relative to handle portion 704. For example, detection sensor 720 may include a capacitive touch sensor on handle portion 704, such as adjacent to third-finger button 712 or in a position for engagement by the user's fourth or fifth finger when grasping the handle. A detection sensor 720 may be positioned to be engaged by a portion of the user's second finger (i.e., index finger) or third finger (i.e., middle finger) that is on handle portion 704 adjacent to trigger button 710 or third-finger button 712, indicating the presence of the user's fingers on handle portion 704 even if the associated finger has been lifted off of trigger button 710 or third-finger button 712. Detection sensors 720 may be included on handle portion 704 corresponding to the position of all of the user's fingers grasping the handle.

In one embodiment, one or more of detection sensors 720 may include proximity sensors configured to detect a spatial location of a user's fingers and/or hand relative to handle portion 704. For example, detection sensor 720 could be used to detect a presence of the user's finger and/or a separation distance between the respective finger and the surface of handle portion 704. Detection sensors 720 may be configured to allow detection of movement of the user's fingers or other portions of the user's hand relative to the handle portion 704. The detected separation distance and/or movement may be used in connection with signals, commands, or other control signals related to the hand shape or position of the user's hand or fingers relative to the handle portion 704.

In some embodiments, handle portion 704 may include a combination of buttons, pressure sensors, capacitive touch sensors, and/or proximity sensors that may provide signals to initiate a command or to replicate a hand configuration in a corresponding virtual object or avatar. Furthermore, hand-held controller 700 may also include a plurality of tracking features 722 positioned in a corresponding tracking pattern, such as controller tracking pattern 724. Tracking features 722 in tracking pattern 724 may be configured to be accurately tracked by a suitable optical tracking system to determine the motion, orientation, and/or spatial position of the controller for reproduction in an artificial environment. Tracking features 722 may include, for example, fiducial markers and/or light emitting diodes (LED).

Furthermore, although not shown in FIG. 7, hand-held controller 700 may also include one or more additional electronic elements, one or more IMUs, one or more additional tracking emitters or detectors, and/or any other suitable device or system for facilitating tracking of a position of hand-held controller 700 within a real-world environment via secondary tracking method 516.

In some examples, primary tracking method 510 and secondary tracking method 516 may include different tracking methods. For example, as described above, in at least one embodiment, primary tracking method 510 may include a computer vision tracking method and secondary tracking method 516 may include an optical tracking method and/or an inertial tracking method. In additional or alternative examples, primary tracking method 510 and secondary tracking method 516 may include similar tracking methods, although they may remain physically, logically, electrically, optically, communicatively, functionally, methodologically, and/or otherwise distinct from each other. For example, primary tracking method 510 and secondary tracking method 516 may both include optical tracking methods, but may use different techniques, algorithms, and/or devices to track two separate real-world objects within a real-world environment.

Furthermore, primary tracking method 510 and secondary tracking method 516 may share one or more devices and/or components such as cameras, processors, memory, and so forth while remaining distinct from each other in other ways. Continuing with the above example, primary tracking method 510 and secondary tracking method 516 may both include optical tracking methods and may use the same image sensor (e.g., camera) to capture image data. However, each tracking method may use the image sensor to capture different image data (e.g., different wavelengths, different timings, etc.). Additionally or alternatively, each tracking method may access, receive, obtain, etc. image data captured via the image sensor, but each tracking method may utilize the captured image data in different ways (e.g., primary tracking method 510 may process the captured image data via different techniques and/or algorithms than secondary tracking method 516).

Tracking module 404 may track (1) primary real-world position 504 of primary real-world object 506 within real-world environment 508 via primary tracking method 510 and (2) secondary real-world position 512 of secondary real-world object 514 within real-world environment 508 via secondary tracking method 516 in a variety of contexts. For example, primary tracking method 510 and/or secondary tracking method 516 may generate and/or receive raw data from one or more sensors included in an artificial reality system (e.g., sensor 240, sensors 220, one or more camera assemblies, one or more IMUS, one or more proximity sensors, etc.). Tracking module 404 may store this raw data as part of tracking data 442 within data store 440. Tracking module 404 may additionally or alternatively receive, access, and/or analyze tracking data 442 in accordance with (1) primary tracking method 510 in order to determine primary real-world position 504, and (2) in accordance with secondary tracking method 516 in order to determine secondary real-world position 512. Tracking module 404 may then store primary real-world position 504 and/or secondary real-world position 512 as part of tracking data 442 for later use by one or more of modules 402, and/or may transmit primary real-world position 504 and/or secondary real-world position 512 to one or more of modules 402 (e.g., presenting module 406, detecting module 408, transitioning module 410, etc.) for use in one or more additional operations as described herein.

Hence, one or more of modules 402 (e.g., presenting module 406, detecting module 408, and/or transitioning module 410) may access and/or receive tracking data 442 to perform one or more operations, such as presenting a virtual object that corresponds to a tracked real-world object within an artificial environment, detecting an interaction of primary real-world object 506 with secondary real-world object 514, and/or transitioning from tracking primary real-world object 506 via primary tracking method 510 to tracking primary real-world object 506 via secondary tracking method 516.

Figure 8:
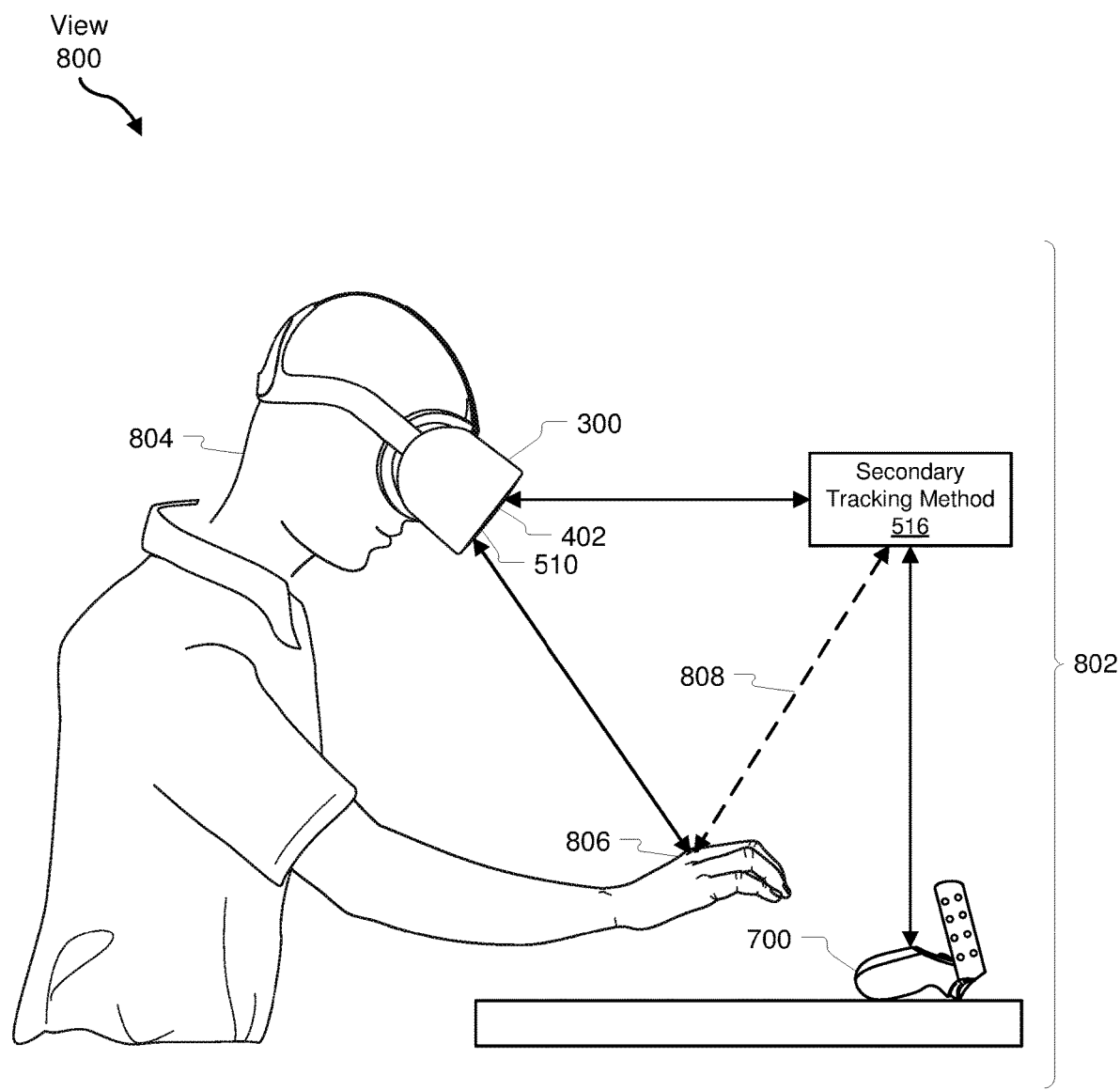
FIG. 8 is a view of an example implementation of an example system for transitioning between modes of tracking real-world objects for artificial reality interfaces.

FIG. 8 is a view 800 of an implementation of an example system for transitioning between modes of tracking real-world objects for artificial reality interfaces. As shown in FIG. 8, a user 804 may wear a VR system 300 within a real-world environment 802. As described above, VR system 300 may include and/or may be in communication with system 500, and/or may include modules 402. Furthermore, VR system 300 may include, may implement, and/or may be in communication with primary tracking method 510 and secondary tracking method 516.

As shown, user 804 may be interacting with a virtual environment via VR system 300 and may be reaching a hand 806 toward hand-held controller 700. Tracking module 404 may be tracking (1) a position of hand 806 within real-world environment 802 via primary tracking method 510, and (2) a position of hand-held controller 700 within real-world environment 802 via secondary tracking method 516. As will be described in greater detail below, upon one or more of modules 402 (e.g., detecting module 408) detecting an interaction of hand 806 with hand-held controller 700, one or more of modules 402 (e.g., transitioning module 410) may transition from tracking hand 806 via primary tracking method 510 to tracking hand 806 via secondary tracking method 516, as indicated by transition indicator 808. Additional examples and explanations of tracking real-world objects via a primary tracking method and a secondary tracking method will be provided in reference to FIGS. 9-13 below.

Returning to FIG. 6, at step 620, one or more of the systems described herein may present (1) a primary virtual object that represents the primary real-world object at a position within an artificial environment corresponding to the position of the primary real-world object within the real-world environment, and (2) a secondary virtual object that represents the secondary real-world object at a position within the artificial environment corresponding to the position of the secondary real-world object within the real-world environment. For example, presenting module 406 may present primary virtual object 518 at primary artificial environment position 520 within artificial environment 522 corresponding to primary real-world position 504 of primary real-world object 506 within real-world environment 508. Additionally, presenting module 406 may present secondary virtual object 524 at secondary artificial environment position 526 within artificial environment 522 corresponding to secondary real-world position 512 of secondary real-world object 514 within real-world environment 508.

In some examples, an "artificial environment" may include any computer-generated environment including, without limitation, an artificial reality environment, a VR environment, an AR environment, a 2D environment, a 3D environment, a combination of one or more of the same, and so forth. In some examples, an artificial environment may include a 2D or 3D representation of a real-world environment (e.g., real-world environment 508). In some examples, an artificial environment (e.g., artificial environment 522) may be overlaid and/or composited with an image of the real-world environment. In some such examples, one or more virtual objects included in the artificial environment may appear to a user, when the user views the composite image, to exist within the real-world environment.

Furthermore, in some examples, a "virtual object" may include, without limitation, any asset, model, object, and/or resource that may be presented within an artificial environment. In some embodiments, a virtual object may represent an associated real-world object within a real-world environment. For example, a virtual object of a hand of a user may represent a hand of a user within a real-world environment. As another example, a virtual object of an artificial reality controller device (e.g., hand-held controller 700) may represent an artificial reality controller device within a real-world environment.

Presenting module 406 may present virtual objects within artificial environments in a variety of contexts. For example, presenting module 406 may cause a display device included in an artificial reality system (e.g., AR system 200 and/or VR system 300) to display artificial environment 522 to a user, and may present one or more virtual objects within artificial environment 522.

In some examples, presenting module 406 may present virtual objects within artificial environment 522 at positions and/or in configurations that may correspond to positions and/or configurations of real-world objects within a real-world environment. For example, presenting module 406 may present a virtual object at a position within an artificial environment by determining a position within an artificial environment that corresponds to a position within a real-world environment of a corresponding real-world object.

Presenting module 406 may determine a position within an artificial environment (e.g., primary artificial environment position 520 and/or secondary artificial environment position 526) that corresponds to a position within a real-world environment (e.g., primary real-world position 504 and/or secondary real-world position 512) of a corresponding real-world object (e.g., primary real-world object 506 and/or secondary real-world object 514) in any suitable way. For example, presenting module 406 may access and/or receive tracking data 442 from data store 440 that may include primary real-world position 504 and/or secondary real-world position 512. Presenting module 406 may then identify a position or positions within artificial environment 522 that may correspond to primary real-world position 504 and/or secondary real-world position 512 and may designate the identified position and/or positions as primary artificial environment position 520 and/or secondary artificial environment position 526.

Furthermore, presenting module 406 may present virtual objects within artificial environments by identifying an attribute of a real-world object and selecting a virtual object to represent the real-world object based on the identified attribute. The identified attribute of the real-world object may include any suitable attribute including, without limitation, a size, an appearance, a shape, a color, a configuration, an orientation, a composition, a position, a relationship to another real-world object, variations or combinations of one or more of the same, and so forth. In some examples, selecting a virtual object may include adjusting an appearance of the virtual object based on the identified attribute.

By way of illustration, in at least one embodiment, primary real-world object 506 may include a hand of a user. Presenting module 406 may access tracking data 442, which may include an image of primary real-world object 506 captured as part of a computer vision tracking method. Presenting module 406 may then identify, based on the image, an attribute of primary real-world object 506, such as a shape, size, and/or configuration of primary real-world object 506. Presenting module 406 may then select, from virtual object data 444, primary virtual object 518 based on the attribute. For example, presenting module 406 may select a virtual object of a human hand based on primary real-world object 506 having a shape of a hand, and may designate the selected virtual object as primary virtual object 518. Additionally, presenting module 406 may adjust an appearance of the virtual object based on the image. For example, presenting module 406 may adjust a size of the virtual object such that an apparent size of primary virtual object 518 may appear similar to a size of primary real-world object 506. Presenting module 406 may then present primary virtual object 518 within artificial environment 522 at primary artificial environment position 520.

Hence, presenting module 406 may present a virtual object (e.g., primary virtual object 518 and/or secondary virtual object 524) at a position (e.g., a location and/or an orientation) within an artificial environment (e.g., primary artificial environment position 520 and/or secondary artificial environment position 526) such that the position and/or configuration of the virtual object within the artificial environment corresponds to a position and/or configuration of a real-world object (e.g., primary real-world position 504 and/or secondary real-world position 512) within a real-world environment 508 (e.g., real-world environment 508). Additional examples and illustrations of presenting virtual objects within artificial environments will be provided below in reference to FIGS. 9-13.

Returning to FIG. 6, at step 630, one or more of the systems described herein may detect an interaction of a primary real-world object with a secondary real-world object. For example, detecting module 408 may, as part of computing device 502, detect interaction 528 of primary real-world object 506 with secondary real-world object 514.

In some examples, an "interaction" or an "interaction with a real-world object" may include any action of a real-world object with respect to another real-world object. For example, an interaction of primary real-world object 506 with secondary real-world object 514 may include, without limitation, a touch of secondary real-world object 514 by primary real-world object 506, an approach of primary real-world object 506 within a predetermined threshold distance of secondary real-world object 514, a touching, grasping or lifting of secondary real-world object 514 by primary real-world object 506, a release of secondary real-world object 514 by primary real-world object 506, a change in a proximity of primary real-world object 506 to secondary real-world object 514, and so forth.

Detecting module 408 may detect interaction 528 of primary real-world object 506 with secondary real-world object 514 in a variety of contexts. For example, in at least one embodiment, detecting module 408 may detect interaction 528 of primary real-world object 506 with secondary real-world object 514 via any suitable combination of controls and/or sensors included in primary real-world object 506 and/or secondary real-world object 514, such as via a touch sensor included primary real-world object 506 and/or secondary real-world object 514. In some examples, a "touch sensor" may include any sensor that may that may detect, capture, and/or record a physical touch of a real-world object by another real-world object including, without limitation, a physical object and/or a human body part (e.g., a hand of a user). In some examples, a touch sensor may include, without limitation, a capacitive touch sensor, a resistive touch sensor, an infrared touch sensor, a surface acoustic wave (SAW) touch sensor, a pressure sensor, an inertial sensor (e.g., an IMU), an electric field tomography touch sensor, and so forth. In additional or alternative examples, a touch sensor may detect, capture, and/or record a near proximity of a real-world object to another real-world object without relying on physical contact.

By way of illustration, as described above, secondary real-world object 514 may include an artificial reality controller device that may include a capacitive touch sensor, such as hand-held controller 700. Hence, in at least one embodiment, detecting module 408 may detect interaction 528 of primary real-world object 506 with secondary real-world object 514 by detecting, via a capacitive touch sensor included in secondary real-world object 514, a touch of secondary real-world object 514 by primary real-world object 506 (e.g., a touch of hand-held controller 700 by hand 806).

In further embodiments, detecting module 408 may detect interaction 528 of primary real-world object 506 with secondary real-world object 514 by detecting a press of a button included in primary real-world object 506 and/or secondary real-world object 514, a change in inertia of primary real-world object 506 and/or secondary real-world object 514 via an IMU included in primary real-world object 506 and/or secondary real-world object 514, and so forth.

In additional or alternative embodiments, detecting module 408 may detect interaction 528 of primary real-world object 506 with secondary real-world object 514 by determining (e.g., via a proximity sensor included in at least one of primary real-world object 506 and/or secondary real-world object 514), a proximity of secondary real-world object to primary real-world object 506 (e.g., a proximity of hand 806 to hand-held controller 700).

As a simplified example, detecting module 408 may detect an interaction between hand 806 and hand-held controller 700 by determining, via a proximity sensor included in a hand-held controller 700 indicating that an object is within 0.01 m of the hand-held controller, a proximity of hand 806 to hand-held controller 700 of 0.01 m.

In additional examples, detecting module 408 may determine a proximity of primary real-world object 506 to secondary real-world object 514 by comparing primary real-world position 504, as tracked by primary tracking method 510, and secondary real-world position 512, as tracked by secondary tracking method 516. Detecting module 408 may then determine, based on the comparison, a proximity of primary real-world object 506 to secondary real-world object 514.

To illustrate a simplified example, tracking module 404 may track, via primary tracking method 510, primary real-world object 506 to a primary real-world position 504 with coordinates of [+2 m, +1.5 m, −1.6 m] from a predetermined origin point within real-world environment 508. Likewise, tracking module 404 may track, via secondary tracking method 516, secondary real-world object 514 to a secondary real-world position 512 with coordinates of [+2 m, +1.7 m, −1.2 m] from the predetermined origin point. detecting module 408 may then determine, via a geometric distance formula, that primary real-world object 506 is 0.45 m from secondary real-world object 514.

In some examples, detecting module 408 may detect interaction 528 of primary real-world object 506 with secondary real-world object 514 by determining that the proximity of primary real-world object 506 to secondary real-world object 514 is less than a predetermined threshold (e.g., less than 0.0001 m, less than 0.001 m, less than 0.01 m, less than 0.1 m, etc.) For example, a predetermined threshold may be 0.05 m. Thus, when detecting module 408 determines that primary real-world object 506 is within 0.05 m of secondary real-world object 514, detecting module 408 may detect interaction 528 of primary real-world object 506 with secondary real-world object 514.

In some examples, detecting module 408 may combine a variety of tracking data and/or sensor input to identify primary real-world object 506 and/or secondary real-world object 514 and/or to determine a proximity of primary real-world object 506 to secondary real-world object 514. This may, in turn, improve an accuracy and/or robustness of detection of interactions between primary real-world object 506 and secondary real-world object 514. For example, in at least one embodiment, primary tracking method 510 may include a computer vision tracking method. Tracking module 404 may therefore identify, using one or more computer vision techniques, primary real-world object 506 as a hand of a user (e.g., hand 806), and may determine that the hand of the user is at a position of [+2.5 m, +1.3 m, −2.1 m] from a predetermined origin point within real-world environment 508.

Continuing with this example, secondary tracking method 516 may include an optical tracking method and secondary real-world object 514 may include a hand-held controller 700 configured to be tracked via an optical tracking method. Tracking module 404 may determine secondary real-world position 512 of secondary real-world object 514 of [+2.6 m, +1.4 m, −2.2 m] via secondary tracking method 516. Furthermore, a proximity sensor included in hand-held controller 700 may indicate that an object is within 0.17 m of hand-held controller 700. Based on this combination of information, detecting module 408 may identify hand 806 as the object that is within 0.17 m of hand-held controller 700.

Hence, in some embodiments, detecting module 408 may detect an interaction of a hand of a user (e.g., hand 806) with an artificial reality controller device by identifying primary real-world object 506 as a hand of a user and secondary real-world object 514 as an artificial reality controller device. Additionally, detecting module 408 may determine a proximity of the hand to the artificial reality controller. This may be more accurate and/or may provide increased capability than simply determining a proximity of an object to the artificial reality controller via a proximity sensor.

It may be noted that some tracking methods may enable one or more of modules 402 (e.g., tracking module 404, detecting module 408, etc.) to make additional determinations regarding one or more real-world objects. For example, a computer vision tracking method may, by analysis of one or more images of primary real-world object 506 via one or more machine learning methods, enable detecting module 408 to further determine that primary real-world object 506 includes a left hand of a user and/or a right hand of the user.

Furthermore, as described above, in some examples, an artificial reality controller device such as hand-held controller 700 may be configured to be operated by a right hand of a user, a left hand of the user, or either hand of the user. One or more of modules 402 (e.g., tracking module 404, detecting module 408, etc.) may determine whether an artificial reality controller is configured to be operated by a left hand of a user, a right hand of the user, or either hand of the user. For example, tracking module 404 may determine, via primary tracking method 510 (e.g., a computer vision tracking method), secondary tracking method 516 (e.g., an optical tracking method configured to track an artificial reality controller device via reference to one or more tracking features included in the artificial reality controller device), that hand-held controller 700 is configured to be operated by a left hand of a user. Additionally or alternatively, tracking module 404 may receive one or more identifiers from hand-held controller 700, via any suitable communications medium, that may indicate that hand-held controller 700 is configured to be operated by a left hand of the user.

Thus, detecting module 408 may detect an interaction of a hand of a user with an artificial reality controller device that is configured to be operated via that hand (e.g., an interaction of a left hand of a user with a left-handed controller and/or an interaction of a right hand of the user with a right-handed controller). Conversely, detecting module 408 may detect an interaction of a hand of a user with an artificial reality controller device that is configured to be operated by a different hand of the user (e.g., an interaction of a right hand with a left-handed controller and/or an interaction of a left hand with a right-handed controller).

In some examples, one or more of modules 402 (e.g., presenting module 406) may present a notification to a user upon detecting module 408 detecting an interaction (e.g., interaction 528) of a hand of the user and an artificial reality controller when the artificial reality controller is configured to be operated by the right hand of the user and detecting module 408 determines that the hand is a left hand of the user. Furthermore, one or more of modules 402 (e.g., presenting module 406) may present a notification to the user upon detecting module 408 detecting an interaction (e.g., interaction 528) of a hand of the user and an artificial reality controller when the artificial reality controller is configured to be operated by the left hand of the user and detecting module 408 determines that the hand is a right hand of the user.

By way of illustration, if a user is using an artificial reality system such as illustrated in FIG. 8, hand 806 may include a right hand of user 804 and hand-held controller 700 may be configured to be operated by a left hand of user 804. In such a configuration, detecting module 408 may determine that hand 806 is a right hand of user 804, and may detect an interaction of hand 806 with hand-held controller 700 upon user 804 picking up hand-held controller 700 with hand 806. Upon detecting module 408 detecting the interaction of hand 806 with hand-held controller 700, presenting module 406 may present a notification (e.g., within artificial environment 522) to the user that indicates that the user has attempted to pick up a left-handed controller (e.g., hand-held controller 700) with his or her right hand (e.g., hand 806). The notification may also instruct the user to switch hand-held controller 700 to the user's left hand. Thus, the systems and methods described herein may assist users in correct operation of one or more artificial reality systems.

Returning to FIG. 6, at step 640, one or more of the systems described herein may transition from tracking a position of a primary real-world object within a real-world environment via a primary tracking method to tracking the position of the primary real-world object within the real-world environment via the secondary tracking method in response to detecting an interaction of the primary real-world object with the secondary real-world object. For example, transitioning module 410 may, as part of computing device 502, transition from tracking (e.g., via tracking module 404) primary real-world position 504 of primary real-world object 506 within real-world environment 508 via primary tracking method 510 to tracking (e.g., via tracking module 404) primary real-world position 504 of primary real-world object 506 within real-world environment 508 via secondary tracking method 516.

Transitioning module 410 may transition from tracking (e.g., via tracking module 404) primary real-world position 504 of primary real-world object 506 within real-world environment 508 via primary tracking method 510 to tracking (e.g., via tracking module 404) primary real-world position 504 of primary real-world object 506 within real-world environment 508 via secondary tracking method 516 in a variety of contexts. For example, transitioning module 410 may transition from tracking primary real-world object 506 via primary tracking method 510 by determining that primary real-world object 506 and secondary real-world object 514 are joined together as a unified real-world object, and may track (e.g., cause tracking module 404 to track) the unified real-world object via secondary tracking method 516.

In additional embodiments, transitioning module 410 may further transition from tracking primary real-world object 506 via primary tracking method 510 to tracking primary real-world object 506 within real-world environment 508 via secondary tracking method 516 by deactivating primary tracking method 510. This may enable a computing device that implements primary tracking method 510 to free up, deactivate, reallocate, and/or redistribute computing resources (e.g., processing resources, memory resources, power resources, etc.) that computing device 502 may have previously utilized to execute primary tracking method 510.

By way of illustration, as described above in reference to FIG. 8, in some embodiments, primary real-world object 506 may include a hand of a user such as hand 806, and primary tracking method 510 may include a computer vision tracking method. Furthermore, in some examples, secondary real-world object 514 may include an artificial reality controller, such as hand-held controller 700, and secondary tracking method 516 may include an optical tracking method configured to track hand-held controller 700. One or more of modules 402 (e.g., detecting module 408) may detect an interaction of hand 806 with hand-held controller 700, such as user 804 touching, picking up, and/or otherwise interacting with hand-held controller 700 via hand 806. In response to detecting the interaction of hand 806 with hand-held controller 700, transitioning module 410 may transition from tracking hand 806 via the computer vision tracking method to tracking hand 806 via the optical tracking method by determining that hand 806 is holding hand-held controller 700, and may therefore cause tracking module 404 to track hand 806 and hand-held controller 700 as a unified real-world object via the optical tracking method by tracking hand-held controller 700 via one or more tracking features 722 included in tracking pattern 724.

Upon transitioning to tracking hand 806 via the optical tracking method, transitioning module 410 may deactivate the computer vision tracking method. This may enable computing device 502 to free up, deactivate, reallocate, and/or redistribute computing resources that computing device 502 may have used to facilitate the computer vision tracking method to other processes, components, and/or devices.

In some embodiments, one or more of modules 402 (e.g., detecting module 408) may detect an additional interaction of primary real-world object 506 with secondary real-world object 514. In response, one or more of modules 402 (e.g., transitioning module 410) may transition from tracking primary real-world position 504 of primary real-world object 506 within real-world environment 508 via secondary tracking method 516 to tracking primary real-world position 504 of primary real-world object 506 within real-world environment 508 via primary tracking method 510. For example, transitioning module 410 may cause tracking module 404 to reactivate primary tracking method 510 and/or resume tracking primary real-world object 506 via primary tracking method 510.

Continuing with the previous illustration, after user 804 picks up hand-held controller 700 with hand 806, user 804 may release hand-held controller 700 and may move hand 806 away from hand-held controller 700. Detecting module 408 may detect the additional interaction of hand 806 with controller 700 (e.g., may detect, via a touch sensor included in hand-held controller 700, that user 804 has released hand-held controller 700, and/or may detect an increase in a distance between hand 806 and hand-held controller 700) and, in response, transitioning module 410 may transition from tracking hand 806 via the optical tracking method to tracking hand 806 via the computer vision tracking method. In some examples, transitioning from tracking hand 806 via the optical tracking method to tracking hand 806 via the computer vision tracking method may include reactivating the computer vision tracking method and/or resuming tracking hand 806 via the computer vision tracking method.

FIGS. 9-13 illustrate various views of virtual objects within an artificial environment in accordance with one or more embodiments of the systems and methods disclosed herein. FIGS. 9-13 show first-person perspective views of artificial environment 522. In some examples, a VR system (e.g., VR system 300) may present artificial environment 522 to a user (e.g., user 804) via a head-worn display system.

Although not shown in FIGS. 9-13, in the scenarios illustrated in FIGS. 9-13, one or more of modules 402 (e.g., tracking module 404) may be tracking a position of a primary real-world object, such as a position of a left and/or right hand of user, within a real-world environment via a primary tracking method (e.g., a computer vision tracking method). One or more of modules 402 (e.g., tracking module 404) may also be tracking a position of a secondary real-world object (e.g., a position of a left-handed and/or a right-handed controller) within the real-world environment via a secondary tracking method (e.g., an optical tracking method).

Figure 9:
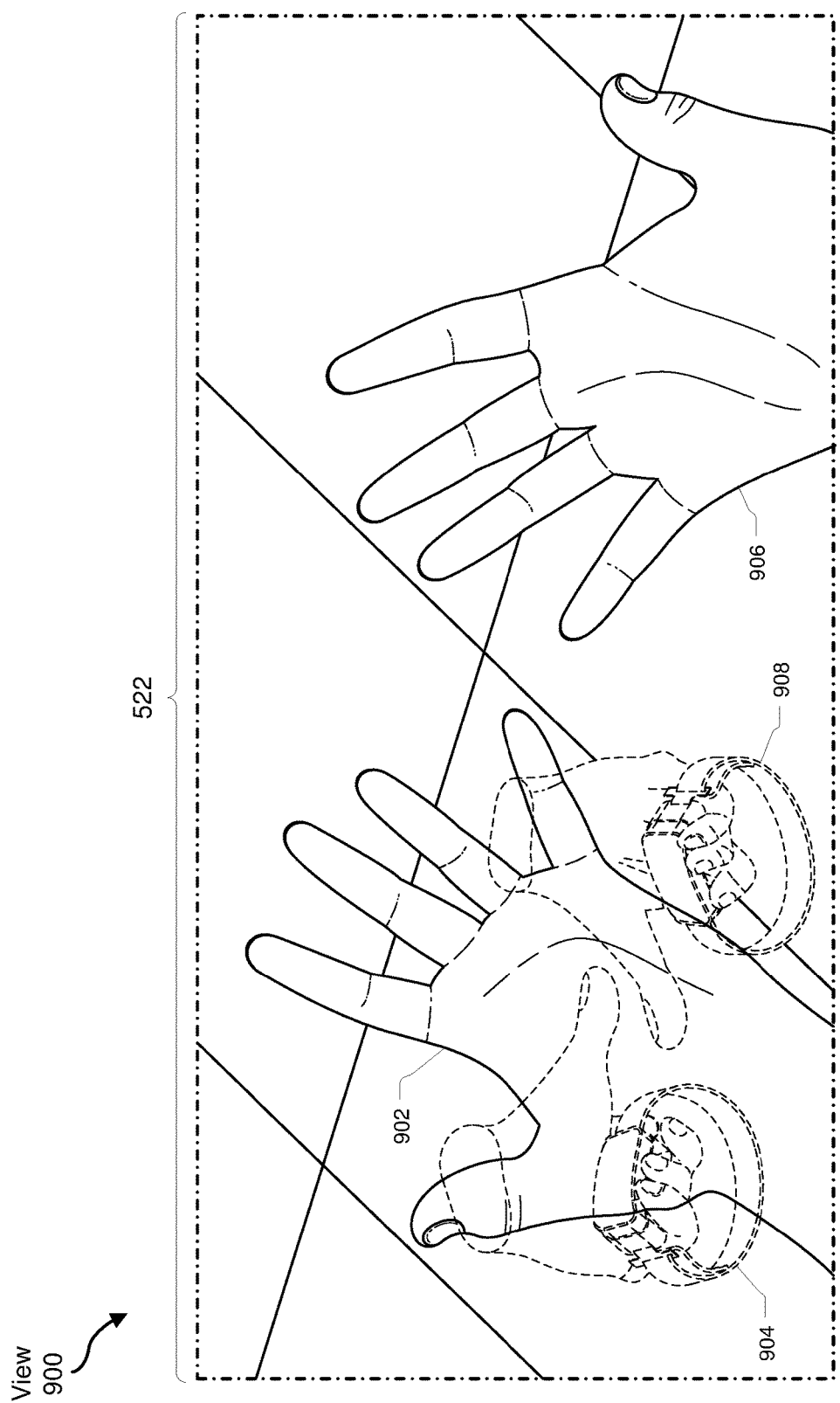
FIGS. 9-13 show various views of virtual objects within an artificial environment in accordance with one or more embodiments of the systems and methods disclosed herein.

As shown in FIG. 9, view 900 may include a left hand virtual object 902. Left hand virtual object 902 may be a primary virtual object that represents the primary real-world object (e.g., a left hand of a user). Presenting module 406 may be presenting left hand virtual object 902 at a position within artificial environment 522 corresponding to the position of the primary real-world object within real-world environment 508. Furthermore, FIG. 9 also includes a left-handed controller virtual object 904 that may represent a secondary real-world object (e.g., a hand-held controller 700). Presenting module 406 may be presenting left-handed controller virtual object 904 at a position within artificial environment 522 corresponding to the position of the secondary real-world object within the real-world environment.

As will be described in greater detail below, FIG. 900 further includes a right hand virtual object 906 that may represent a tracked right hand of the user and a right-handed controller virtual object 908 that may represent a tracked right-handed controller. These virtual objects may represent additional real-world objects located in a real-world environment that tracking module 404 may also track in similar ways to how tracking module 404 may track the primary and secondary real-world objects.

In some examples, presenting module 406 may adjust an appearance of one or more virtual objects in order to facilitate user interaction with one or more corresponding real-world objects. For example, as shown in FIG. 9, left-handed controller virtual object 904 and right-handed controller virtual object 908 may be at least partially visible through left hand virtual object 902 (i.e., left hand virtual object 902 may be at least partially transparent with regard to at least left-handed controller virtual object 904 and right-handed controller virtual object 908), which may aid user 804 in locating hand-held controller 700 within real-world environment 802 without removing the head-worn display system of VR system 300.

Additionally, as described above, in some embodiments, detecting module 408 may determine a proximity of a primary real-world object to a secondary real-world object. Therefore, in some examples, presenting module 406 may adjust an appearance of one or more virtual objects based on (e.g., in proportion to) the proximity of the primary real-world object to the secondary real-world object.

Figure 10:
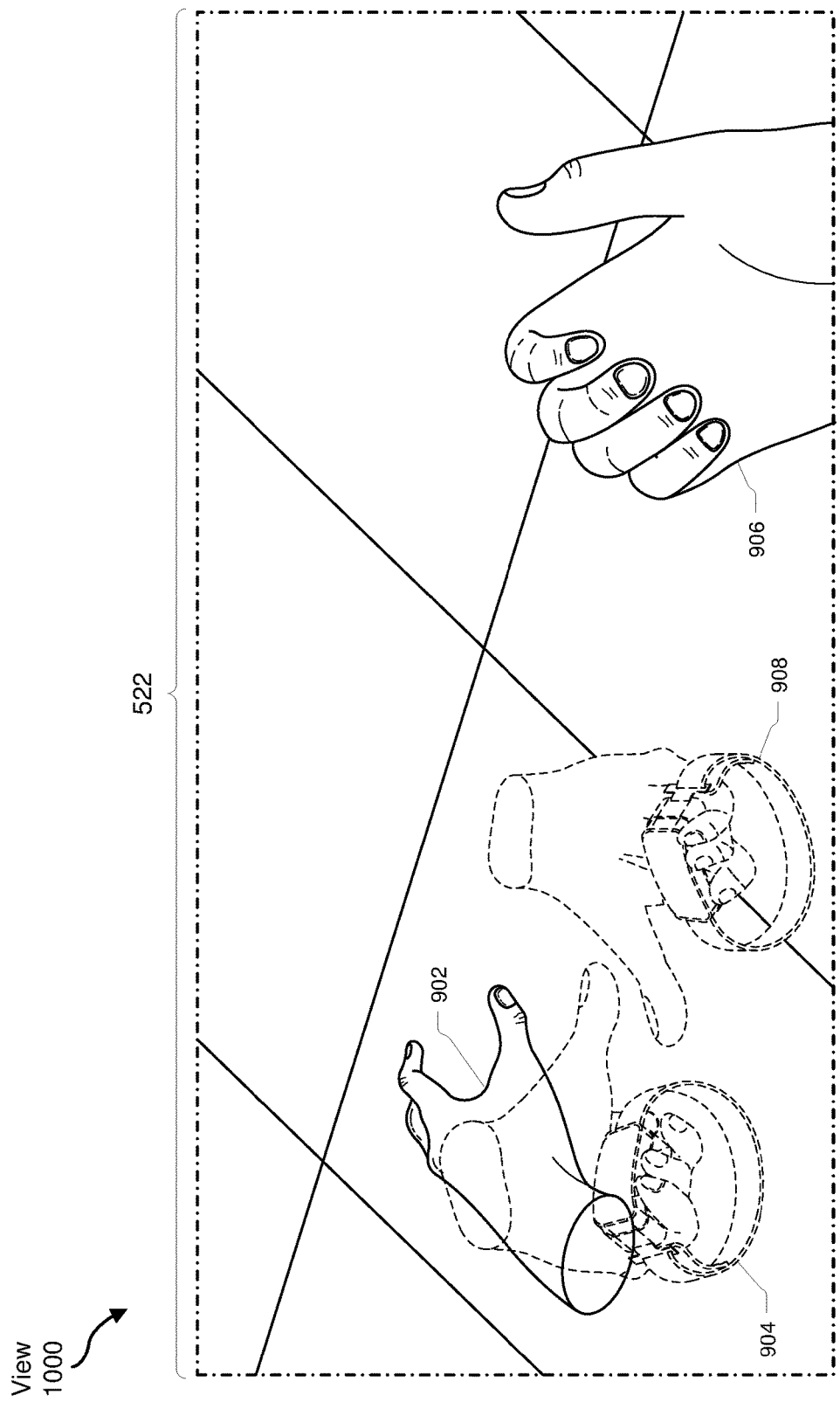

By way of illustration, FIG. 10 shows an additional view 1000 of artificial environment 522. In FIG. 10, the user is reaching his or her left hand, represented by left hand virtual object 902, toward the left-handed controller, represented by left-handed controller virtual object 904. As the distance separating the user's left hand and the left-handed controller decreases, presenting module 406 may adjust, in proportion to the proximity of the user's left hand to the left-handed controller, an appearance of left hand virtual object 902 and/or left-handed controller virtual object 904. For example, and without limitation, presenting module 406 may adjust, in proportion to the proximity of the user's left hand to the left-handed controller, a color, a size, a relative size, a transparency, a resolution, a definition, an audio profile, and so forth of left hand virtual object 902 and/or left-handed controller virtual object 904. This may provide a dynamic feedback mechanism to a user of an artificial reality system that may enable the user to locate and/or interact with real-world objects within a real-world environment without requiring the user to remove a head-worn display system.

Furthermore, in some examples, presenting module 406 may adjust an appearance of a primary virtual object and/or a secondary virtual object in response to transitioning module 410 transitioning from tracking the position of the primary real-world object within the real-world environment via the primary tracking method to tracking the position of the primary real world object within the real-world environment via the secondary tracking method. For example, presenting module 406 may adjust, without limitation, a color, a size, a relative size, a transparency, a resolution, a definition, an audio profile, and so forth of primary virtual object 518 and/or secondary virtual object 524 in response to transitioning module 410 transitioning from tracking (e.g., via tracking module 404) primary real-world position 504 of primary real-world object 506 via primary tracking method 510 to tracking primary real-world position 504 of primary real-world object 506 via secondary tracking method 516. This may provide a visual cue to a user of an artificial reality system that may indicate to the user that primary real-world object 506 (e.g., a hand of the user) is no longer being tracked via primary tracking method 510 and is instead being tracked via secondary tracking method 516.

In at least some embodiments, presenting module 406 may present a unified virtual object within artificial environment 522 that represents both primary real-world object 506 and secondary real-world object 514 in response to a transition of tracking methods. For example, in response to transitioning module 410 transitioning from tracking primary real-world position 504 of primary real-world object 506 via primary tracking method 510 to tracking primary real-world position 504 of primary real-world object 506 via secondary tracking method 516, presenting module 406 may present a unified virtual object that represents both primary real-world object 506 and secondary real-world object 514 at primary artificial environment position 520.

Figure 11:
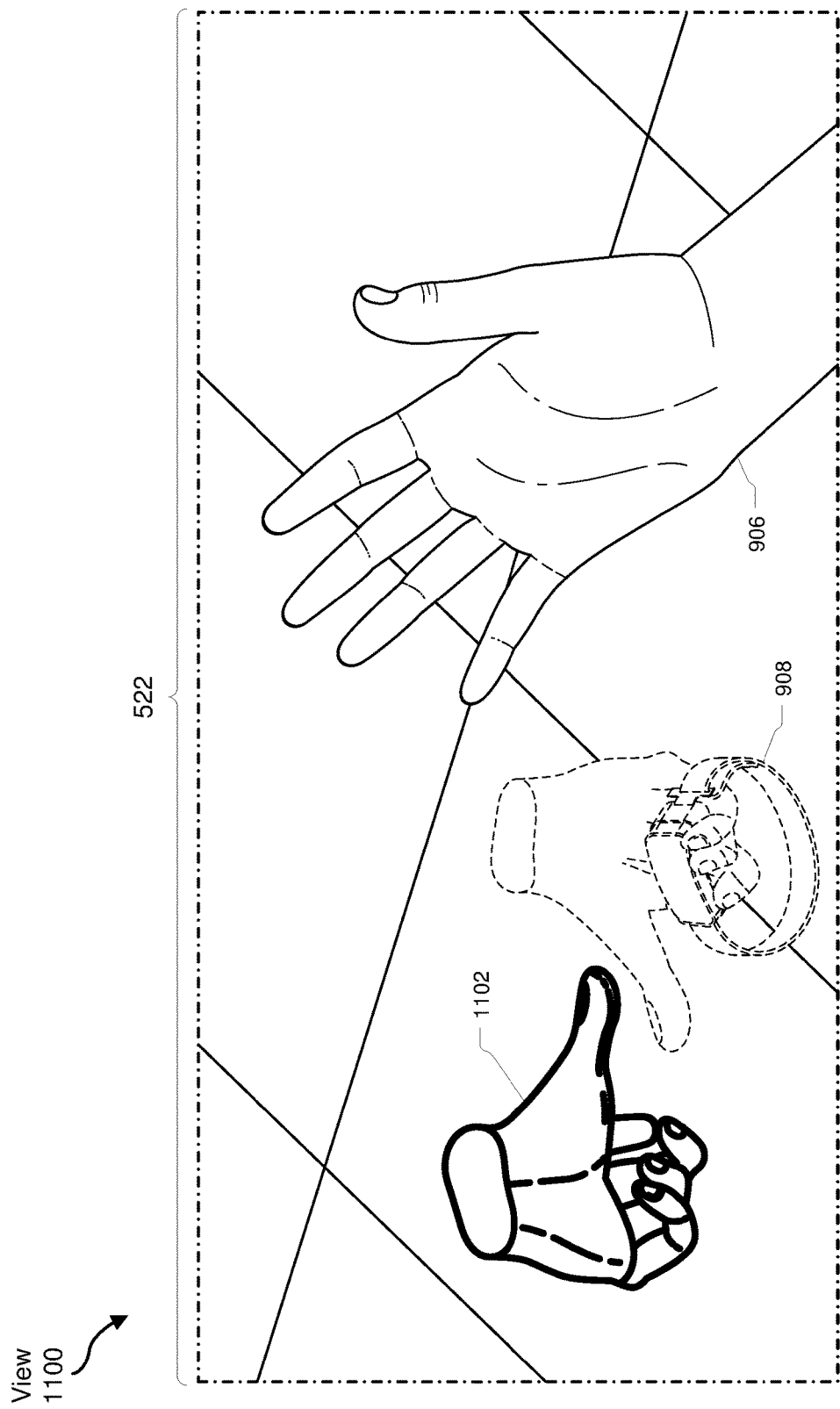

To illustrate, FIG. 11 shows an additional view 1100 of artificial environment 522. As shown in FIG. 11, a user's left hand has interacted with a left-handed controller (e.g., the user has touched, grasped, and/or picked up the left-handed controller with his or her left hand). Detecting module 406 has detected the interaction, and transitioning module 410 has transitioned from tracking a position of the user's left hand via a primary tracking method (e.g., a computer vision tracking method) to tracking the position of the user's left hand via a secondary tracking method (e.g., an optical and/or inertial tracking method configured to track a position of the left-handed controller via one or more tracking features included in the left-handed controller).

In the example illustrated in FIG. 11, presenting module 406 is presenting a left unified virtual object 1102 at a position within artificial environment 522 that corresponds to the position of the user's left hand within the real-world environment. Left unified virtual object 1102 may represent both the user's left hand that previously corresponded to left hand virtual object 902 and the left-handed controller that previously corresponded to left-handed controller virtual object 904. While, as in this example, left unified virtual object 1102 may replace left hand virtual object 902 and/or left-handed controller virtual object 904, in other examples, presenting module 406 may continue to present left hand virtual object 902 and/or left-handed controller virtual object 904 along with left unified virtual object 1102. Additionally or alternatively, presenting module 406 may adjust left hand virtual object 902 and/or left-handed controller virtual object 904 in any suitable way upon presenting left unified virtual object 1102.

In some embodiments, the systems and methods described herein may be simultaneously applied to multiple sets of real-world objects. For example, as shown in FIGS. 9-11, tracking module 404 may also track, while tracking a left hand of a user via a primary tracking method (e.g., a computer vision tracking method), a right hand of the user via the primary tracking method. Likewise, presenting module 406 may also present, while presenting left hand virtual object 902, right hand virtual object 906 at a position within artificial environment 522 that corresponds to the tracked position of the right hand of the user within the real-world environment. Tracking module 404 and/or presenting module 406 may perform these functions in any of the ways described above in reference to a left hand of a user.

Moreover, tracking module 404 may also track, while tracking a left-handed controller via a secondary tracking method (e.g., an optical and/or inertial tracking method), a right-handed controller via the secondary tracking method.

Likewise, presenting module 406 may also present, while presenting left-handed controller virtual object 904, right-handed controller virtual object 908 at a position within artificial environment 522 that corresponds to the tracked position of the right-handed controller within the real-world environment. Tracking module 404 and/or presenting module 406 may perform these functions in any of the ways described above in reference to a left-handed controller.

Furthermore, detecting module 408 may also detect an interaction of a right hand of a user with a right-handed controller in any of the ways described herein, and may similarly transition from tracking the right hand of the user via the primary tracking method to tracking the right hand of the user via the secondary tracking method in any of the ways described herein in reference to the left hand of the user and/or the left-handed controller.

Figure 12:
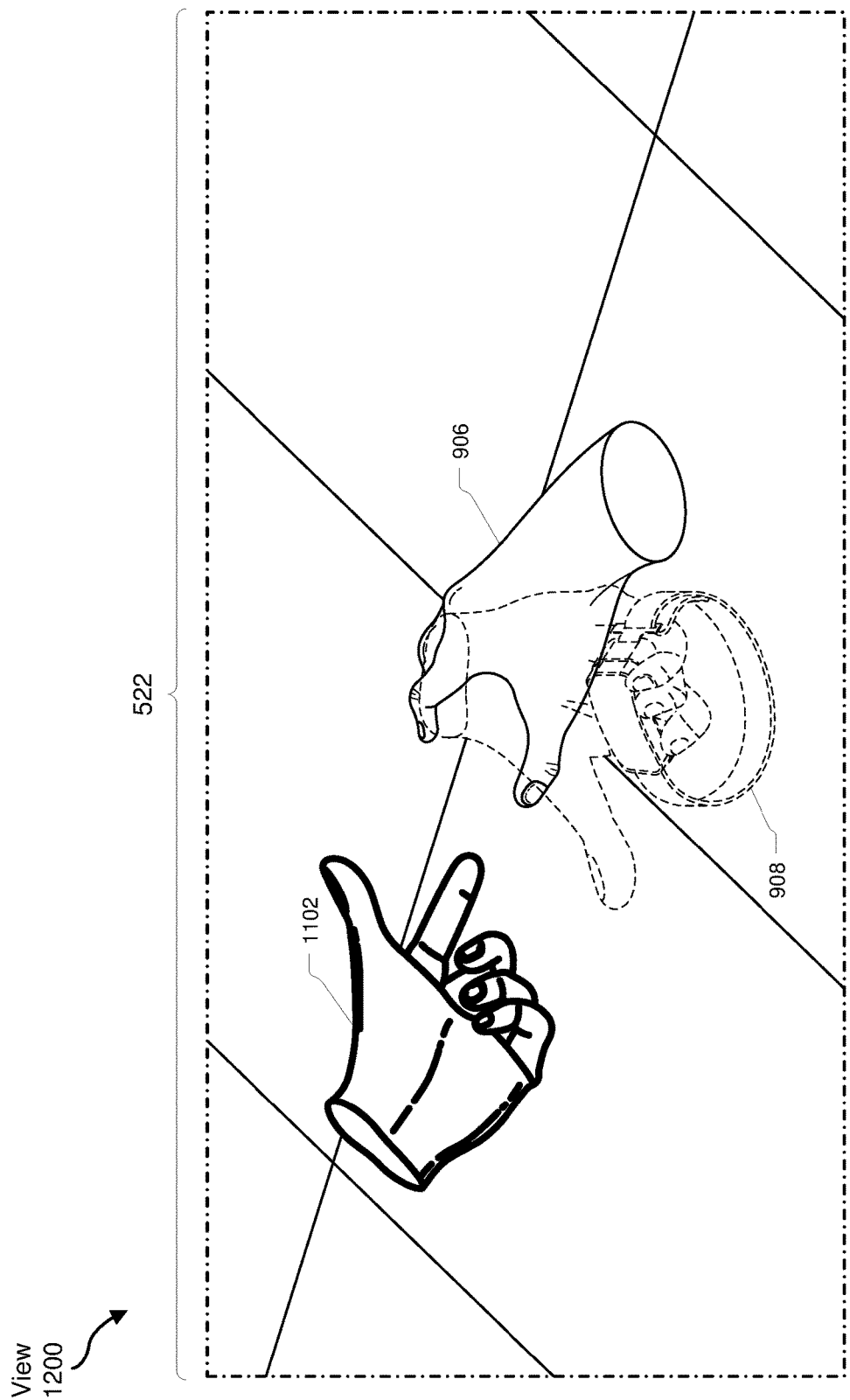

To illustrate, FIG. 12 includes a view 1200 of artificial environment 522. As shown, the user has already picked up the left-handed controller with his or her left hand. Detecting module 406 has detected that interaction. Transitioning module 410 has also transitioned to tracking the user's left hand via the secondary tracking method and has replaced left hand virtual object 902 and left-handed controller virtual object 904 with left unified virtual object 1102.

As further shown in FIG. 12, the user is also reaching his or her right hand toward a right-handed controller, as represented respectively within artificial environment 522 by right hand virtual object 906 and right-handed controller virtual object 908. Tracking module 404 may be tracking the user's right hand via the primary tracking method (e.g., the computer vision tracking method) and may be tracking the right-handed controller via the secondary tracking method (e.g., the optical and/or inertial tracking method). Detecting module 408 may detect the user picking up the right-handed controller with his or her right hand and may transition from tracking the user's right hand via the primary tracking method to tracking the user's right hand via the secondary tracking method.

Figure 13:
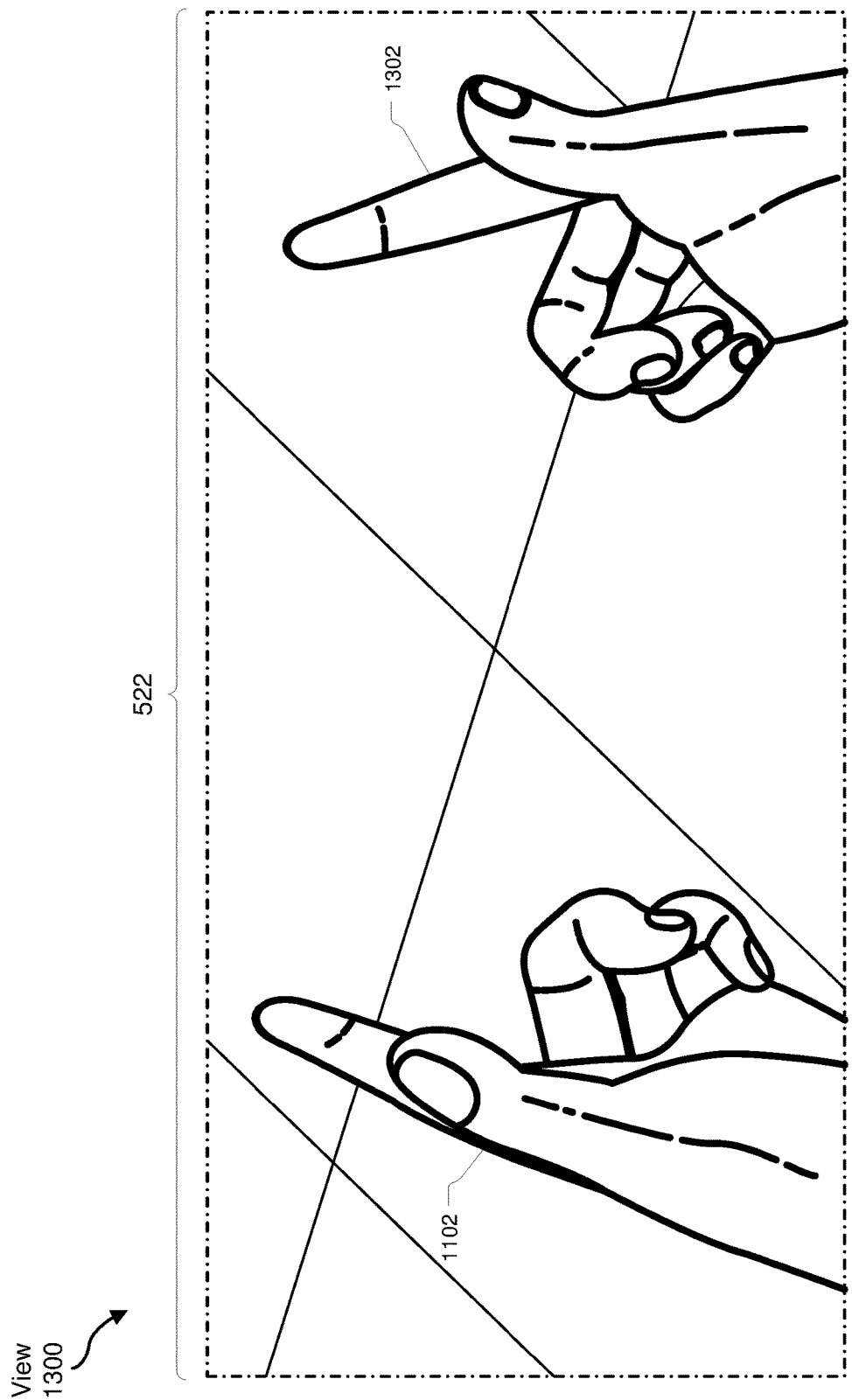

FIG. 13 includes a view 1300 of artificial environment 522 that includes left unified virtual object 1102 and right unified virtual object 1302. As shown, transitioning module 410 may have transitioned to tracking the right hand of the user via the secondary tracking method, and presenting module 406 may have replaced right hand virtual object 906 and right-handed controller virtual object 908 with a right unified virtual object 1302. Hence, in this example, one or more of the systems described herein may be tracking positions of the user's left hand, the user's right hand, the left-handed controller, and the right-handed controller within the real-world environment via the secondary tracking method (e.g., via the optical and/or inertial tracking method).

Additionally or alternatively, embodiments of the systems and methods described herein may perform any other suitable operations in response to transitioning module 410 transitioning from tracking primary real-world object 506 via primary tracking method 510 to tracking primary real-world object 506 via secondary tracking method 516. By way of example, one or more of modules 402 (e.g., presenting module 406, detecting module 408, transitioning module 410, etc.) may cause one or more components of AR system 100, AR system 200, VR system 300, system 400, and/or system 500 (e.g., a display device included in AR system 200 and/or VR system 300, output audio transducers 306(A) and 306(B), a touch controller, such as hand-held controller 700, etc.) to present any suitable information (e.g., a visual indication, an audible alert, a haptic feedback response, etc.) to a user that may indicate that the transition (e.g., transition 530) has occurred.

As discussed throughout the instant disclosure, the disclosed systems and methods may provide one or more advantages over traditional artificial reality systems. For example, embodiments of the systems and methods described herein may track multiple real-world objects and may present, within an artificial environment, virtual objects that may represent the real-world objects and/or may reflect real-world spatial relationships of those real-world objects.

In one illustration, an embodiment may track a user's hands and any available hand-held controllers that may be within the real-world environment. The embodiment may also present virtual objects that represent the user's hands and any available hand-held controllers within an artificial environment. The presented virtual objects may have similar spatial relationships within the artificial environment as the real-world objects have within the real-world environment. Thus, as the user views the artificial environment via a head-mounted display device that may obstruct the user's view of the real-world environment, he or she may still be able to identify, locate, and/or otherwise interact with real-world objects (e.g., his or her hands, one or more hand-held controllers, etc.) within the real-world environment.

Additionally, embodiments of the systems and methods described herein may enable an artificial reality system to use more efficient, more accurate, and/or less resource-intensive tracking methods to track real-world objects when those tracking methods may provide equivalent, appropriate and/or otherwise suitable tracking of those real-world objects.

For example, while a user is interacting with an artificial reality system by using his or her hands (i.e., without a hand-held controller), a computer vision tracking method may accurately track a position of the user's hands within a real-world environment and may enable accurate representation of the user's hands within an artificial environment. However, while a user interacts with an artificial environment via an optically trackable hand-held controller, an optical tracking method may accurately track a position of the user's hand within the real-world environment by tracking a position of the hand-held controller within the real-world environment. Hence, while the user interacts with the artificial environment via the optically trackable hand-held controller, the systems and methods described herein may discontinue the more computing-resource-intensive computer vision tracking method, and may reallocate resources to other operations (e.g., rendering of an artificial environment, processing of audiovisual data, etc.) while the user is interacting with the artificial environment via the hand-held controller.

Furthermore, the systems and methods described herein may enhance usability of one or more artificial reality systems. For example, as described above, embodiments of the systems and methods described herein may be able to determine whether a user is correctly operating an artificial reality controller configured to be operated by a particular hand of a user (e.g., a left hand or a right hand) with the correct hand. If a user attempts, for example, to pick up a right-handed controller with his or her left hand, embodiments of the systems and methods described herein may present a notification to the user that may instruct the user in the proper operation of the artificial reality controller device. This may instruct the user in proper operation of the artificial reality system, and/or may prevent the user from operating the artificial reality system in an incorrect and/or non-optimal way.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive tracking data to be transformed, transform the tracking data, output a result of the transformation to track a position of a primary real-world object within a real-world environment via a primary tracking method, use the result of the transformation to present a virtual object at a position within an artificial environment that corresponds to the position of the real-world object within the real-world environment, and store the result of the transformation to transition from tracking the primary real-world object via the primary tracking method to tracking the primary real-world object via a secondary tracking method. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some examples, a "computer-readable medium" may include any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    tracking:
        a position of a primary real-world object within a real-world environment via a primary tracking method; and
        a position of a secondary real-world object within the real-world environment via a secondary tracking method;
    presenting:
        a primary virtual object that represents the primary real-world object at a position within an artificial environment corresponding to the position of the primary real-world object within the real-world environment; and
        a secondary virtual object that represents the secondary real-world object at a position within the artificial environment corresponding to the position of the secondary real-world object within the real-world environment;
    detecting:
        an interaction of the primary real-world object with the secondary real-world object; and
        an additional interaction of the primary real-world object with the secondary real-world object;
    determining a proximity of the primary real-world object to the secondary real-world object by:
        determining a position of the primary real-world object based on the primary tracking method;
        determining a position of the secondary real-world object based on the secondary tracking method; and
        comparing the position of the primary real-world object with the position of the secondary real-world object; and
    transitioning:
        from tracking the position of the primary real-world object within the real-world environment via the primary tracking method to tracking the position of the primary real-world object within the real-world environment via the secondary tracking method in response to detecting the interaction of the primary real-world object with the secondary real-world object; and
        from tracking the position of the primary real-world object within the real-world environment via the secondary tracking method to tracking the position of the primary real-world object within the real-world environment via the primary tracking method in response to detecting the additional interaction of the primary real-world object with the secondary real-world object.

2. The computer-implemented method of claim 1, wherein the primary tracking method comprises a computer vision tracking method and the secondary tracking method comprises at least one of:
an optical tracking method;
a simultaneous localization and mapping (SLAM) tracking method; or
an inertial tracking method.

3. The computer-implemented method of claim 1, further comprising adjusting, in response to transitioning from tracking the position of the primary real-world object within the real-world environment via the primary tracking method to tracking the position of the primary real-world object within the real-world environment via the secondary tracking method, an appearance of at least one of:
the primary virtual object; or
the secondary virtual object.

4. The computer-implemented method of claim 1, wherein detecting the interaction of the primary real-world object with the secondary real-world object comprises determining that the proximity of the primary real-world object to the secondary real-world object is less than a predetermined threshold.

5. The computer-implemented method of claim 1, further comprising adjusting, based on the proximity of the primary real-world object to the secondary real-world object, an appearance of at least one of:
the primary virtual object; or
the secondary virtual object.

6. The computer-implemented method of claim 1, further comprising presenting, in response to transitioning from tracking the position of the primary real-world object within the real-world environment via the primary tracking method to tracking the position of the primary real-world object within the real-world environment via the secondary tracking method, at the position within the artificial environment corresponding to the position of the primary real-world object within the real-world environment, a unified virtual object that represents both the primary real-world object and the secondary real-world object.

7. The computer-implemented method of claim 1, wherein:
the primary real-world object comprises a hand of a user; and
the secondary real-world object comprises an artificial reality controller device.

8. The computer-implemented method of claim 1, wherein:
the secondary real-world object comprises a touch sensor; and
detecting the interaction of the primary real-world object with the secondary real-world object comprises detecting, via the touch sensor, a touch of the secondary real-world object by the primary real-world object.

9. The computer-implemented method of claim 1, further comprising determining that the primary real-world object comprises one of:
a left hand of a user; or
a right hand of the user.

10. The computer-implemented method of claim 9, wherein:
the secondary real-world object comprises an artificial reality controller device configured to be operated by the user via one of:
the left hand of the user; or
the right hand of the user; and
the computer-implemented method further comprises presenting a notification to the user upon detecting the interaction of the primary real-world object with the secondary real-world object and when at least one of:
the artificial reality controller device is configured to be operated by the right hand of the user and upon determining that the primary real-world object comprises the left hand of the user; or
the artificial reality controller device is configured to be operated by the left hand of the user and upon determining that the primary real-world object comprises the right hand of the user.

11. A system comprising:
a tracking module, stored in memory, that tracks:
a position of a primary real-world object within a real-world environment via a primary tracking method; and
a position of a secondary real-world object within the real-world environment via a secondary tracking method;
a presenting module, stored in memory, that presents:
a primary virtual object that represents the primary real-world object at a position within an artificial environment corresponding to the position of the primary real-world object within the real-world environment; and
a secondary virtual object that represents the secondary real-world object at a position within the artificial environment corresponding to the position of the secondary real-world object within the real-world environment;
a detecting module, stored in memory, that detects:
an interaction of the primary real-world object with the secondary real-world obiect;
an additional interaction of the primary real-world object with the secondary real-world object; and
a proximity of the primary real-world object to the secondary real-world object By:
determining a position of the primary real-world object based on the primary tracking method;
determining a position of the secondary real-world object based on the secondary tracking method; and
comparing the position of the primary real-world object with the position of the secondary real-world object;
a transitioning module, stored in memory, that transitions:
from tracking the position of the primary real-world object within the real-world environment via the primary tracking method to tracking the position of the primary real-world object within the real-world environment via the secondary tracking method in response to detecting the interaction of the primary real-world object with the secondary real-world object; and
from tracking the position of the primary real-world object within the real-world environment via the secondary tracking method to tracking the position of the primary real-world object within the real-world environment via the primary tracking method in response to detecting the additional interaction of the primary real-world object with the secondary real-world object; and at least one physical processor that executes the tracking module, the presenting module, the detecting module, and the transitioning module.

12. The system of claim 11, wherein the presenting module further adjusts, in response to the transitioning module transitioning from tracking the position of the primary real-world object within the real-world environment via the primary tracking method to tracking the position of the primary real-world object within the real-world environment via the secondary tracking method, an appearance of at least one of:

the primary virtual object; or the secondary virtual object.

13. The system of claim 11, wherein the detecting module detects the interaction of the primary real-world object with the secondary real-world object by determining that the proximity of the primary real-world object to the secondary real-world object is less than a predetermined threshold.

14. The system of claim 11, wherein the presenting module adjusts, based on the proximity of the primary real-world object to the secondary real-world object, an appearance of at least one of:

the primary virtual object; or the secondary virtual object.

15. The system of claim 11, wherein:

the secondary real-world object comprises an artificial reality controller device configured to be operated by a user via one of:

a left hand of the user; or a right hand of the user;

the detecting module further determines that the primary real-world object comprises one of:

the left hand of the user; or the right hand of the user; and the presenting module further presents a notification to the user upon the detecting module detecting the interaction of the primary real-world object with the secondary real-world object and when at least one of:

the artificial reality controller device is configured to be operated by the right hand of the user and upon the detecting module determining that the primary real-world object comprises the left hand of the user; or the artificial reality controller device is configured to be operated by the left hand of the user and upon the detecting module determining that the primary real-world object comprises the right hand of the user.

16. A non-transitory computer-readable medium comprising instructions that, when executed by at least one processor of a computing system, cause the computing system to:

track:
a position of a primary real-world object within a real-world environment via a primary tracking method; and
a position of a secondary real-world object within the real-world environment via a secondary tracking method;

present:
a primary virtual object that represents the primary real-world object at a position within an artificial environment corresponding to the position of the primary real-world object within the real-world environment; and
a secondary virtual object that represents the secondary real-world object at a position within the artificial environment corresponding to the position of the secondary real-world object within the real-world environment;

detect:
an interaction of the primary real-world object with the secondary real-world object; and
an additional interaction of the primary real-world object with the secondary real-world object;

determine a proximity of the primary real-world object to the secondary real-world object by:
determining a position of the primary real-world object based on the primary tracking method;
determining a position of the secondary real-world object based on the secondary tracking method; and
comparing the position of the primary real-world object with the position of the secondary real-world object; and transition:
from tracking the position of the primary real-world object within the real-world environment via the primary tracking method to tracking the position of the primary real-world object within the real-world environment via the secondary tracking method in response to detecting the interaction of the primary real-world object with the secondary real-world object; and
from tracking the position of the primary real-world object within the real-world environment via the secondary tracking method to tracking the position of the primary real-world object within the real-world environment via the primary tracking method in response to detecting the additional interaction of the primary real-world object with the secondary real-world object.

17. The computer-implemented method of claim 1, wherein the secondary virtual object is at least partially visible through the primary virtual object within the artificial environment.

* * * * *

UNITED STATES PATENT AND TRADEMARK OFFICE
CERTIFICATE OF CORRECTION

PATENT NO. : 10,824,244 B2  
APPLICATION NO. : 16/277761  
DATED : November 3, 2020  
INVENTOR(S) : Kenrick Cheng-Kuo Kin et al.

Page 1 of 1

It is certified that error appears in the above-identified patent and that said Letters Patent is hereby corrected as shown below:

In the Claims

In Column 34, Claim 11, Line 42, after "real-world" delete "obiect" and add "object"

In Column 34, Claim 11, Line 46, after "object" delete "By" and add "by"

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*